INVENTOR
MILTON F. BOND
BY Richard H. Smith
ATTORNEY

FIG. 8
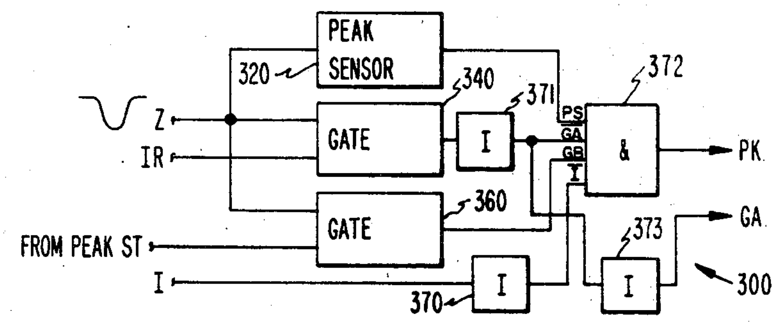
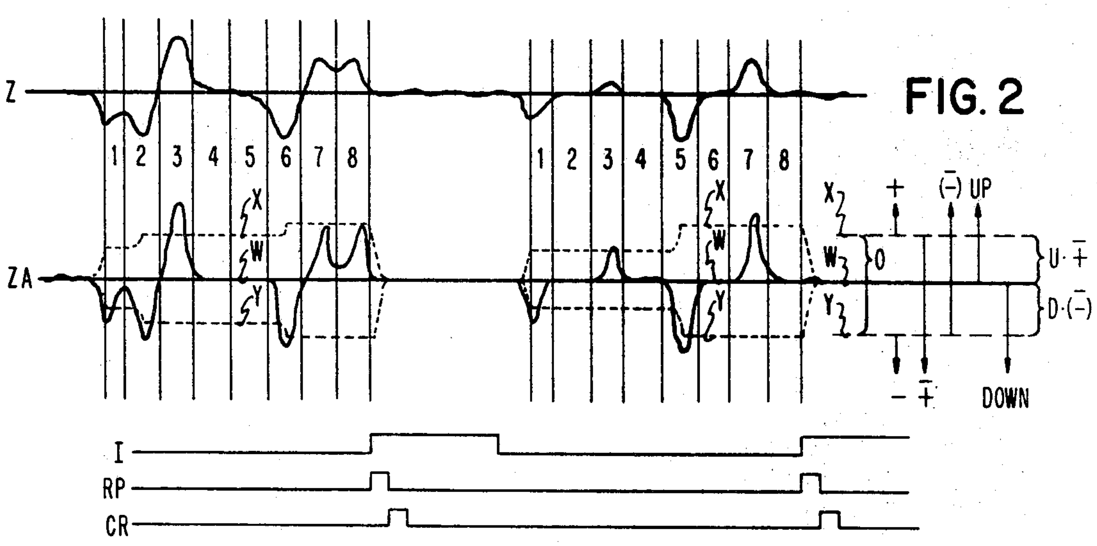
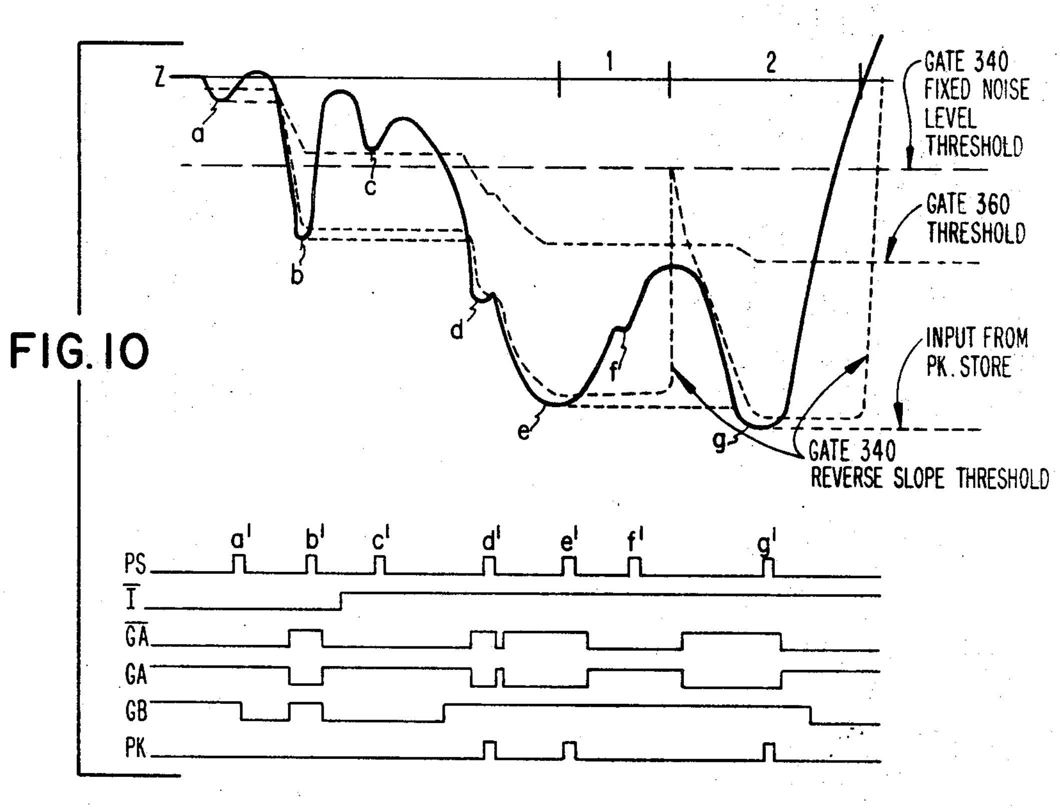

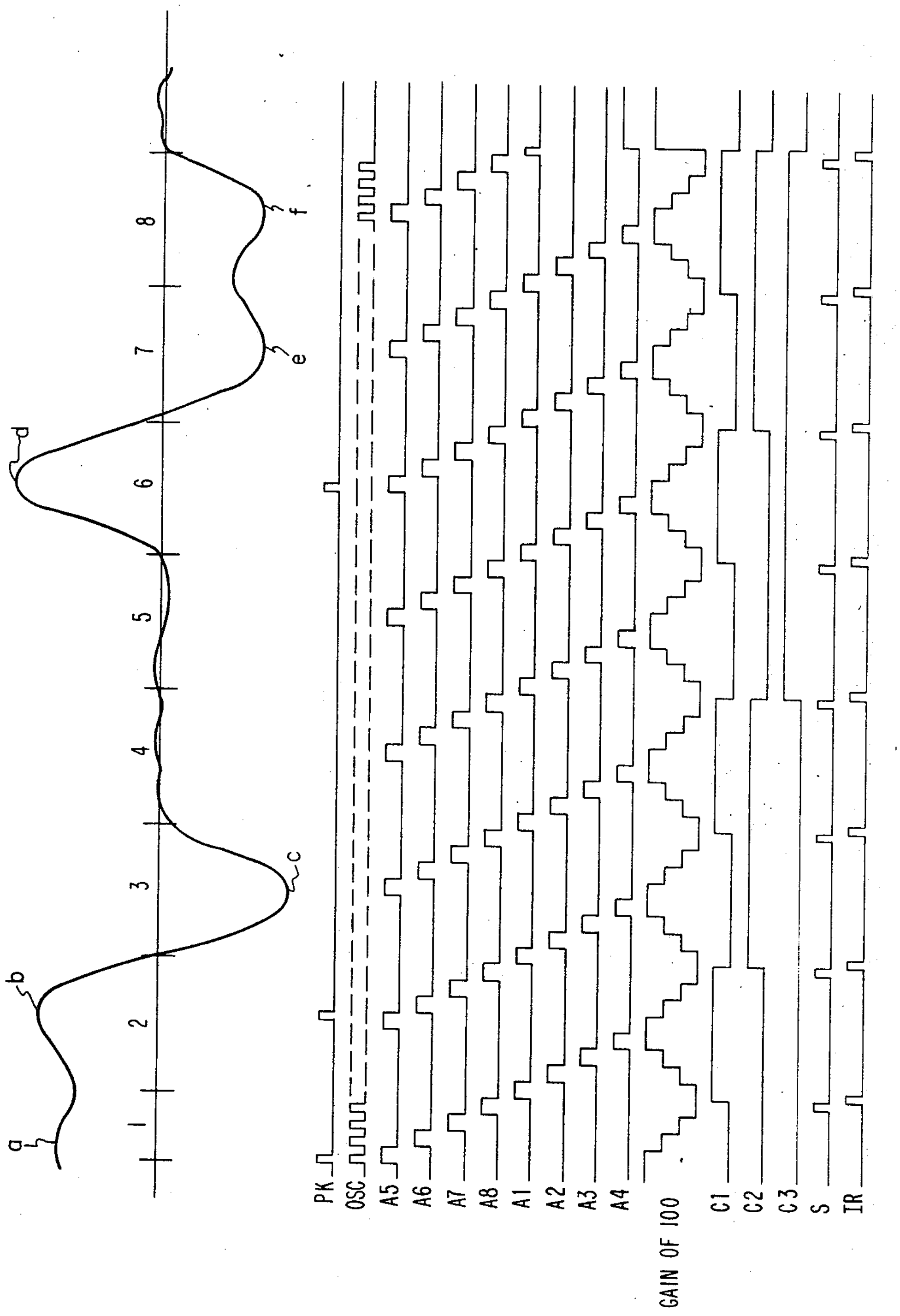
FIG.3 (NOMINAL VELOCITY)

Sept. 8, 1970 M. F. BOND 3,528,058
CHARACTER RECOGNITION SYSTEM
Filed May 27, 1966 13 Sheets-Sheet 4
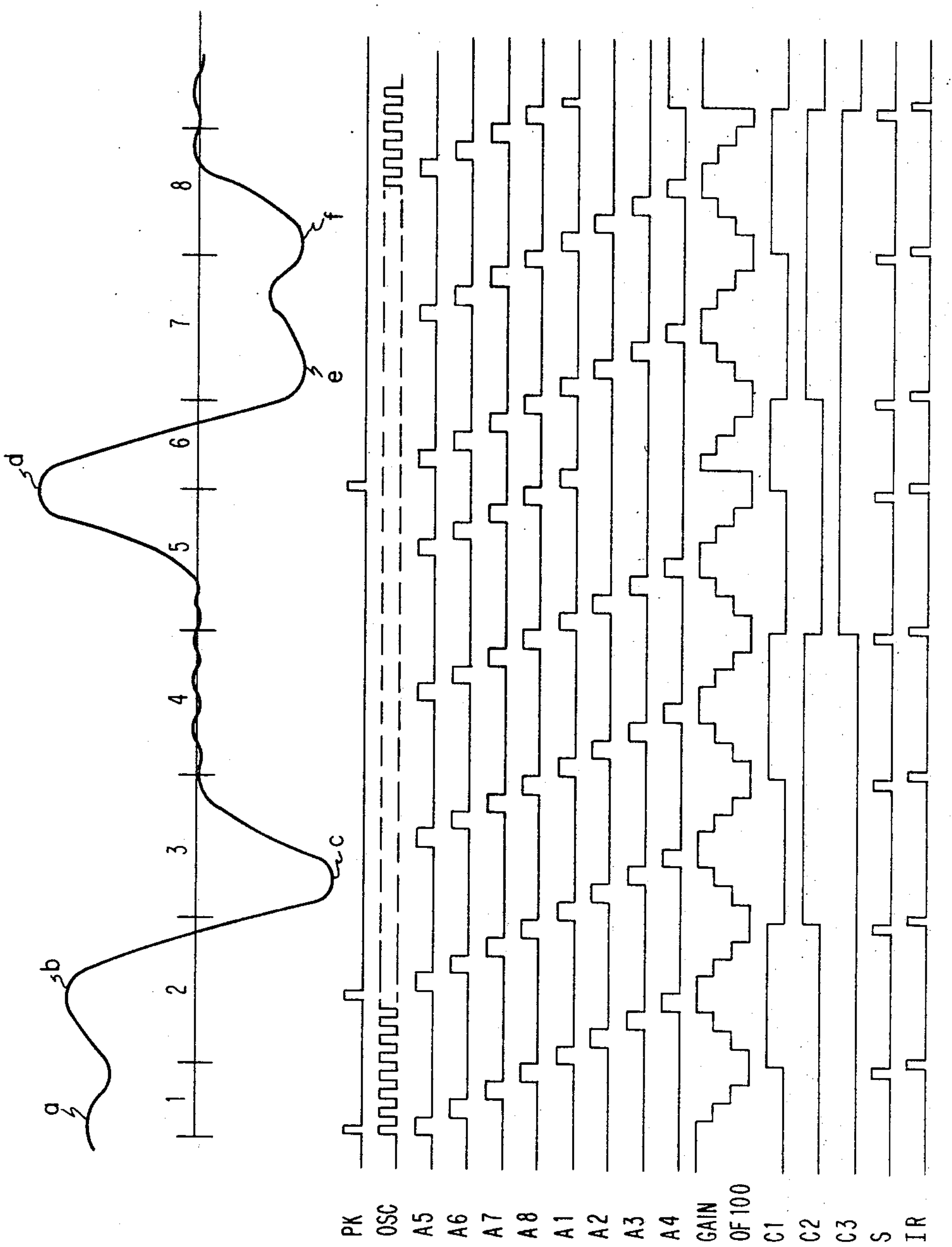
FIG. 4 (10% FAST)

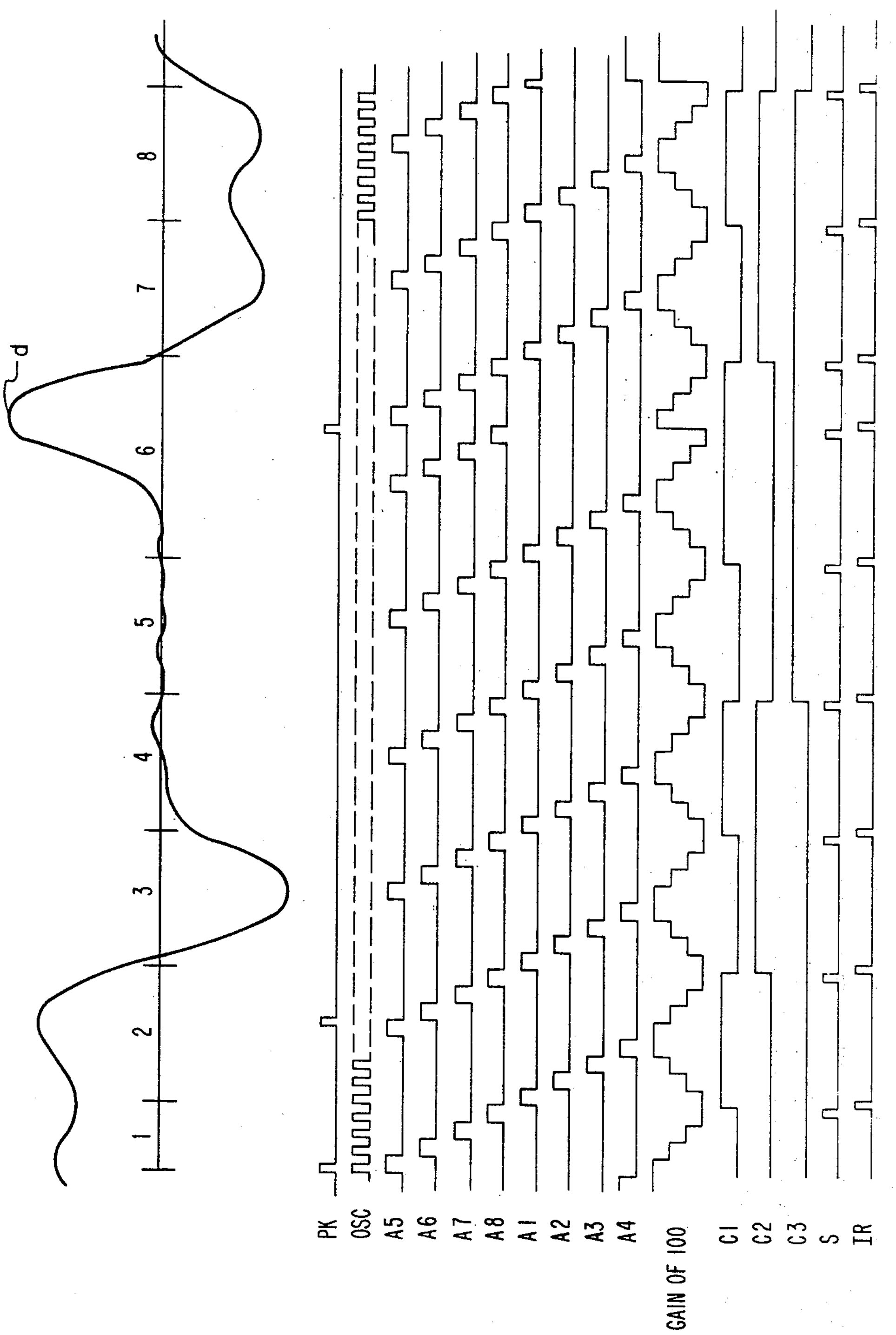
FIG. 5 (10% SLOW)

Sept. 8, 1970 M. F. BOND 3,528,058

CHARACTER RECOGNITION SYSTEM

Filed May 27, 1966 13 Sheets-Sheet 7

Sept. 8, 1970 M. F. BOND 3,528,058

CHARACTER RECOGNITION SYSTEM

Filed May 27, 1966 13 Sheets-Sheet 8

Sept. 8, 1970 M. F. BOND 3,528,058

CHARACTER RECOGNITION SYSTEM

Filed May 27, 1966 13 Sheets-Sheet 11

United States Patent Office 3,528,058
Patented Sept. 8, 1970

3,528,058

CHARACTER RECOGNITION SYSTEM

Milton F. Bond, Rochester, Minn., assignor to International Business Machines Corporation, Armonk, N.Y., a corporation of New York Filed May 27, 1966, Ser. No. 553,488
Int. Cl. G06k 9/10
U.S. Cl. 340—146.3 9 Claims

ABSTRACT OF THE DISCLOSURE

A single-gap magnetic character recognition system adds two further signal-level magnitude statements to the conventional plus, minus and zero statements. These five statements are incorporated into the reference signatures with which the scanner signal is compared for recognition. Signal threshold levels for the plus, minus and zero categories are modified during the scanning of each segment of a scanned character. A controlled-gain amplifier for emphasizing signal peaks has a minimum gain at the beginning and end of each scan segment, and a maximum gain near the center of each segment. Retiming means corrects the separation of character segments to compensate for variations in the speed of the document transport. False retiming from trailing-edge noise within a single segment is preventing by disabling the timing generator after a given peak until a further peak exceeds a threshold value.

This invention relates to a character recognition system and, more particularly, to a system employing a single gap magnetic sensing head for reading magnetized characters of the so-called E 13 B character font.

In single-gap magnetic character reading systems, a single analog input waveform is obtained by passing the characters to be sensed beneath a sensing head at least as wide as the height of the characters and having a single flux gap. The signal generated by the read head is a derivative waveform representing the rate of change of magnetic flux linking the head as the characters are scanned. Since the distribution of ink, and thus flux, associated with each different character is unique, the waveform derived for each different character uniquely identifies that character.

The systems described in U.S. Pat. 3,114,131 to Furr et al. and in copending U.S. patent application Ser. No. 334,232, filed Dec. 30, 1963, by Noble et al., and assigned to the assignee hereof, employ a ternary magnitude classification scheme for analyzing the analog waveform. In accordance with this scheme the peak fluctuations embodied in the waveform, or the slopes between the peaks, are determined to be plus (above a predetermined positive magnitude), minus (more negative than a predetermined negative magnitude), or zero (not plus and not minus), and character recognition is based upon the time pattern of such magnitudes observed for each character. To simplify the timing of the waveform analysis process, the characters are provided with stylized geometric features which impart anticipatable timing characteristics to the derived waveforms. Thus, in accordance with this scheme each character of the E 13 B font is divided into a predetermined number of vertical segments or zones of fixed widths. The characters are designed such that the distribution of ink undergoes significant change only at the boundaries between segments. Hence, peak fluctuations in the derived waveform caused by these variations in ink distribution can occur only at predetermined times during the character scan.

Ternary classification of the peak fluctuations, either through determining the peak amplitudes or the magnitudes of the slopes between peaks, results in adequate character recognition when ideal or near-ideal characters are sensed under nominal conditions. However, when the characters depart in any substantial degree from the ideal, as commonly happens because of variations in ink intensity, character line widths, document mutilation, ink splatter, ink squeeze out, etc., or if document feed velocity varies slightly from the nominal velocity required, the prior art ternary categories of plus, minus and zero become inadequate criteria on which to base reliable character recognition.

It is therefore an object of the present invention to provide a character recognition system having an improved scheme for classifying the magnitudes of peak fluctuations contained in a character signal.

It is a further object to provide a character system having an expanded number of peak magnitude categories to insure more reliable character recognition in cases of severe character degradation.

In the prior art systems described above, the basic time reference for character analysis is established by detecting the peak fluctuation associated with the leading edge of the character and in response thereto initiating a fixed frequency timing signal generator. The timing signals thus produced define the eight character segments. The frequency of the signal generator is based upon a nominal document feed velocity and ideally printed characters having well defined line edges and nominal line widths. As is apparent, ideal characters and nominal sensing conditions may not, indeed will not, always be present. The result is that the timing signals supplied by the signal generator often fall out of synchronization with the actual passage of the character segments past the read head. This degrades the reliability of character detection just as much as peak magnitude distortion.

The aforementioned copending patent application describes a system for re-synchronizing the timing signal generator at selected times during a character scan to mitigate against this problem. The retiming system is based upon detection of peak fluctuations in the analog waveform which occur at times inconsistent with the times they are supposed to occur in accordance with the time base established by the signal generator. While this system adequately overcomes the problems associated with lack of waveform synchronization, difficulties arise when "false retiming" is initiated due to spurious outputs from the peak sensor. Such outputs are caused by ripples in the analog waveform which are not representative of true peaks.

It is therefore another object of the invention to provide a character recognition system of the class described having an improved retiming scheme.

Still another object is to provide a peak detector for a character recognition system of the class described which is extremely sensitive to peak fluctuations in the analog input waveform but which does not adversely affect retiming.

In accordance with one aspect of the invention five basic peak magnitude categories are provided: plus; zero; minus; up; and down. The plus, zero and minus classifications denote substantially the same information as in the systems of the prior art. The up and down classifications are derived by ascertaining whether a peak is either above or below the zero reference level of the analog waveform. Means are provided for logically combining the five magnitude statements for each peak whereby a more useful determination is made regarding the magnitude of the peak. Further, means are provided for continually revising the threshold levels used in determining the plus and minus classifications during the scanning of each character. This prevents the application to all peaks of a character of an abnormally low threshold level set by an unusually small initial peak.

In accordance with another aspect of the invention, the system employs a peak detection circuit which has its output gated to inhibit the application to the timing circuits of all spurious peak detection output signals which could adversely affect system performance. More particularly, output signals from the peak sensing circuit which occur during a predetermined period following the termination of scanning of the character are prevented from being transferred to the timing circuit. Further, all outputs from the peak sensing circuit which are generated in response to ripples occurring on the trailing edge of a primary peak are also inhibited. This is because, while the retiming circuits negate the effects of spurious peak sensing output signals generated in response to ripples on the leading edge of a primary peak, ripples on a trailing edge induce peak sensing output signals which cause false retiming to take place.

Still further, the peak detection circuits inhibit the use of peak detection output signals generated in response to waveform peaks not exceeding a minimum magnitude level. As in the plus-minus magnitude classification circuits, means are provided for continually revising the threshold level during the scanning of a character. Additional means operate in conjunction with the peak detection circuits to prevent the timing circuits from being adversely affected in response to a spurious peak or ripple occurring on the leading edge of an unusually large initial primary peak.

As a result of the highly sophisticated peak detection system of the invention, a very sensitive basic peak sensing circuit may be employed in the system to insure reliable detection of each and every waveform peak. Also, the expanded peak magnitude classification system of the invention enables greater flexibility in arriving at the optimum character recognition logic statement for each character.

The foregoing and other objects, features and advantages of the invention will be apparent from the following more particular description of a preferred embodiment of the invention, as illustrated in the accompanying drawings.

In the drawings:

FIG. 1 is a schematic diagram of the overall character recognition system of the invention.

FIG. 2 is a timing diagram illustrating the analog waveform generated in scanning the number 48 written in the E 13 B font and further shows three of the timing signals generated by the timing circuit of FIG. 1. Also illustrated are the limits of the five basic peak magnitude classifications plus, zero, minus, up and down together with four additional classifications derived therefrom: not plus, not minus, up and not plus, down and not minus.

FIG. 3 is a timing diagram showing the remaining timing signals generated by the timing circuit of FIG. 1 in relation to the analog waveform derived by scanning the character 8 under conditions of nominal document velocity.

FIG. 4 is a timing diagram showing the timing signals produced in response to scanning the character 8 at a velocity 10 percent above nominal velocity.

FIG. 5 is a timing diagram showing the timing signals produced in scanning the character 8 at a velocity 10 percent below nominal velocity.

FIG. 8 is a schematic block diagram of the peak detector circuit of FIG. 1.

FIG. 10 is a timing diagram illustrating the operation of the circuit of FIG. 9.

GENERAL DESCRIPTION OF PREFERRED EMBODIMENT

Figure 1:
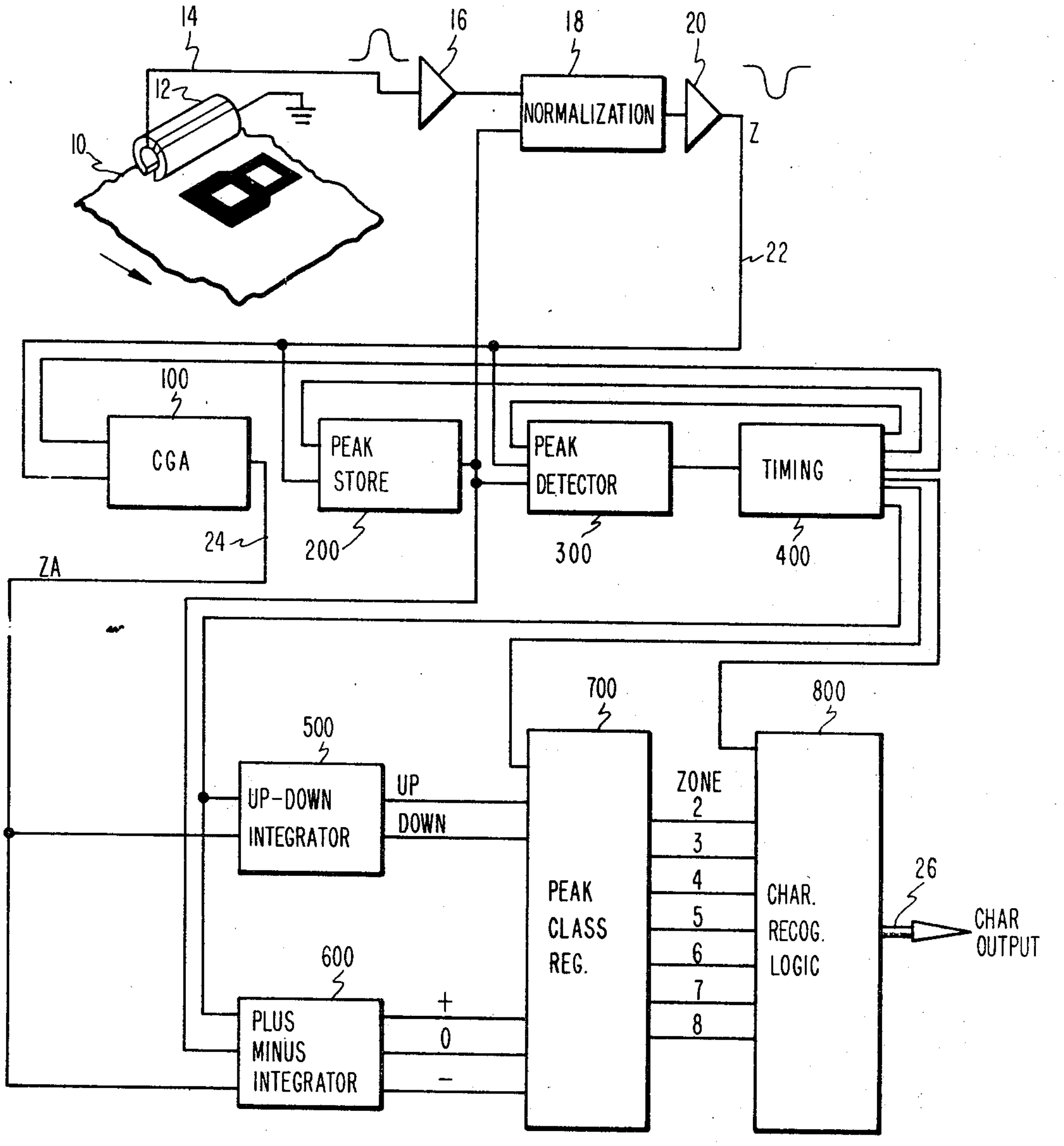

Referring to FIG. 1, the basic elements of the charactor recognition system of the invention are shown. A document 10 bearing magnetized characters of the E 13 B font such as the character 8 shown is driven by conventional document transport means beneath a single-gap magnetic read head 12. Character magnetization means (not shown) may be provided just prior to the read head in the document path. The read head 12 has a width sufficient to span the full height of the characters. The analog signal derived from scanning the characters is transmitted on line 14 to an input amplifier 16, the output from which is transmitted to a normalization circuit 18. The purpose of circuit 18 is to adjust each input character waveform to a common scale. Details of the normalization circuit are disclosed at page 35 of the IBM Technical Disclosure Bulletin, vol. 5, No. 12, May 1963. The output from this circuit is supplied to a second amplifier 20, which amplifies and inverts the normalized analog signal and provides a signal Z via line 22 to a controlled gain amplifier 100, a peak storage circuit 200 and a peak detecting circuit 300.

The purpose of the circuit 100 is to selectively amplify the peak portions of the analog signal Z. This increases the noise rejection of the system and increases the reliability of character recognition. The gain of the amplifier 100 is controlled by signals from timing circuit 400 and is designed to be highest during the times when signal peaks are expected. The selectively amplified analog signal ZA is transmitted on line 24 to an up-down integrating circuit 500 and a plus-minus integrating circuit 600.

The peak storage circuit 200 includes a storage capacitor for storing the negative peaks occurring in the signal Z. That is to say, the level stored on the capacitor will always be equal to the maximum negative peak having occurred in the input. The circuit 200 is reset to a predetermined minimum level by a signal from timing circuit 400 after scanning of each character. Besides being employed in the normalization circuit 18, the output from the peak storage circuit is employed to set threshold levels in the peak detection circuit 300 and the plus-minus integrating circuit 600, as described below.

The peak detecting circuit 300 provides an output signal to the timing circuit 400 each time a "valid" negative peak is detected in the input signal Z. A valid negative peak is generated each time the read head 12 encounters a character segment having a greater amount of flux than the segment (or portion of the document) immediately preceding it. As is described in detail subsequently, the circuit 300 includes a sensitive peak sensing circuit which provides an output pulse of predetermined duration each time the slope of the signal Z changes from a negative value to a positive value. Such will occur not only when the read head 12 responds to a legitimate increase in the character flux but also when ink splatter, etc., causes a spurious flux increase or when circuit noise causes ripples in the signal Z. To permit pulses to be transmitted to the timing circuits in response to these latter peaks would be deleterious to the operation of the system. Therefore, gating circuits are provided in the peak detector 300 for inhibiting the output of the basic peak sensor whenever such occurs in response to:

(1) Peaks which fail to meet a predetermined minimum magnitude criteria as determined by the peak storage circuit 200;

(2) Secondary peaks which occur during the trailing (reverse) slope of a valid peak;

(3) Peaks which occur within a predetermined time period following the completion of a character scan.

It is to be noted that outputs produced in response to spurious peaks on the leading slope of a valid peak are transmitted to the timing circuit. This does not adversely affect system operation because of operation of the retiming circuits, described subsequently.

The timing circuit 400 receives a pulse from peak detector 300 corresponding to the leading edge of each character and in return initiates a series of timing signals which define each of the eight character segments or zones. Since character recognition in the system is based on measurement and classification of peak amplitudes, rather than slope amplitudes, the basic segment or zone periods defined by the signals from the circuit 400 extend from the center of one character segment to the center of the next so that, ideally, each peak in the signal ZA occurs in the middle of a zone timing period.

The zone defining signals are employed to reset the integrators 500 and 600 at the end of each zone period, to time the gating of zone condition statement data into the peak classification register 700 and to reset the reverse slope inhibit gating circuit in the peak detector 300 at the end of each zone. In addition, the circuit 400 generates signals which subdivide each zone period into eight equal subperiods (zone 1 is divided into only four subperiods since its length is half the length of the other zones). These subperiod signals are used to control the gain of the amplifier 100. The circuit 400 also generates signals defining the termination of the eighth zone of each character. These end of character signals are employed to reset peak storage circuit 200, to activate a peak output inhibit gate in peak detector 300 and to control the sampling period of the character recognition logic 800.

The up-down integrating circuit 500 integrates the portions of the analog signal ZA occurring during each zone defined by the timing signals. The circuit includes a positive integrator and a negative integrator with means for feeding only the positive portions of the signal ZA to the positive integrator and the negative portions of the signal to the negative integrator. If the signal is predominantly positive (in terms of the original input on line 14) during the zone, an output exists on the UP line at the end of the zone period. If the signal is predominantly negative, a signal exists on the DOWN line. At the end of each zone period, the digital data contained on the UP and DOWN lines is sampled and stored in the storage circuits of peak classification register 700 which are allocated to that particular zone. After the information has been stored the two integrating circuits are reset in preparation for the next zone time.

The plus-minus integrating circuit 600 also includes a positive integrating circuit and a negative integrating circuit for integrating the positive and negative portions, respectively, of the input waveform ZA during each zone. At the end of the zone the levels at the output of the two integrating circuits are compared with a predetermined threshold level which is a function of the magnitude of the signal then stored in peak storage circuit 200. If the level of the positive integrating circuit exceeds this threshold, an output signal is generated on the MINUS output line and no output signals are generated on the ZERO and PLUS output lines. If the level stored in the negative integrating circuit at the end of a zone exceeds the threshold level, a signal is issued on the PLUS output line and no signals appear on the ZERO or MINUS output lines. If the outputs of both of the positive and negative integrating circuits are below the threshold at the end of the zone, a signal is issued on the ZERO output line and no signals are issued on the PLUS and MINUS lines. At the end of the zone the PLUS, ZERO and MINUS output lines are sampled and the digital zone condition data represented thereon are stored in storage circuits of register 700 allocated to that particular zone.

The above described peak classifications are illustrated in FIG. 2. There, an ideal signal Z generated by scanning the number 48 is superimposed on lines defining the eight times zones established by the timing circuit. The plus and minus threshold levels set by peak storage circuit 200 and employed in integrator 600 are illustrated at X and Y superimposed upon the selectively amplified signal ZA and the zero signal comparison level employed in the up-down integrator is shown at W. At the right, the nine zone condition statements derived from the outputs of the circuits 500 and 600 are graphically related to these thresholds. The nine statements are plus, minus, zero, not plus $(\overline{+})$, not minus $(\overline{-})$, up, down, up and not plus $(U \cdot \overline{+})$ and down and not minus $[D \cdot (\overline{-})]$.

The peak classification register 700 has a total of 49 bistable storage circuits. Seven of these circuits are allocated to each of the character zones 2 through 8 for the purpose of storing the above nine zone condition statements generated for each of these zones during the character scanning operation.

The character recognition logic circuit 800 includes a plurality of coincidence circuits for examining the signals stored in the register 700 following the scanning of each character. A character recognition output signal identifying the character is issued on line 26 in accordance with the signal pattern stored in the register 700 at a time sufficiently following the termination of a character scan to allow the full complement of zone condition statements to have been transferred to the register 700.

The general operation of the system of the invention is as follows:

When the gap of read head 12 encounters the leading edge of a character, a positive-going peak fluctuation is generated on line 14 and appears as a negative going fluctuation in the signal Z on line 22. The magnitude of this peak is stored in peak storage circuit 200. This peak in the signal also causes peak detector 300 to trigger timing circuit 400 into operation. At the end of the zone 1 period as defined by the circuit 400, the reverse slope inhibit gate in peak detector 300 is reset as are the integrators 500 and 600. The outputs of the latter circuits are not stored in register 700 at this time since the data gathered during the period of zone 1 is approximately the same for all characters and thus is not useful for recognition purposes.

During the period of zone 2 integration circuits 500 and 600 operate to classify the magnitude of the signal ZA occurring during that time. Also, the circuit 400 causes the gain of amplifier 100 to increase to a maximum value at the center of the zone and then decrease back to its minimum value so that any valid peak present in the signal Z during the zone 2 period is accentuated in the signal ZA. At the end of zone 2, a timing signal is supplied to register 700 causing the zone condition statements present at the outputs of the integrating circuits to be stored in the zone 2 registers. Also, the integrators 500 and 600 as well as the reverse slope inhibit gate are once again reset.

The signal ZA is analyzed in this manner during the further periods defined for each of the zones 3 through 8. At the termination of the period of zone 8, scanning of the character is complete and the character recognition logic circuit 800 issues its character output signal on line 26 in accordance with the information stored in the register 700.

During the scan of a character, if any output from peak detector 300 occurs sufficiently offset in time from the center of the zone in which it is supposed to occur according to the time base established by timing circuit 400, a retiming operation is performed to resynchronize the circuit 400 with the input waveform. The operation of the retiming circuits is described in detail subsequently.

DETAILED DESCRIPTION OF PREFERRED EMBODIMENT

Timing circuit

Figure 11:
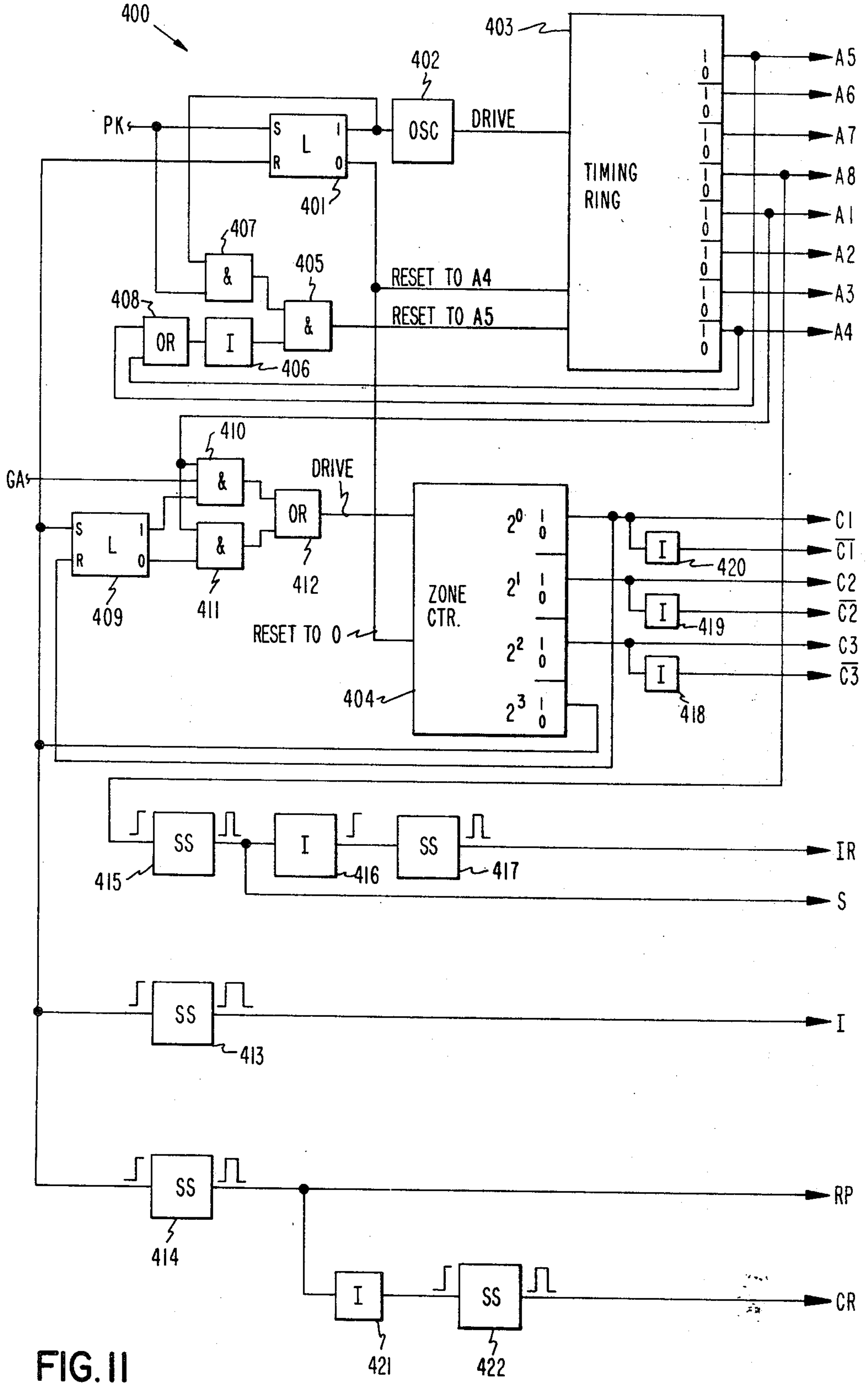
FIG. 11 is a schematic circuit diagram of the timing circuit of FIG. 1.

Timing circuit 400 is shown in detail in FIG. 11. Each peak output signal PK from peak detector 300 is applied to the set side of a bistable latch circuit 401. This input signal causes the 1 output side of the latch to go positive and the 0 output side to go negative. The 1 output turns on oscillator 402 and causes it to begin transmitting a series of equally spaced drive pulses (shown at OSC in FIG. 3) to a timing ring 403. The ring 403 comprises eight bistable flip-flops interconnected in a conventional manner to form a timing ring such that the 1 side of one and only one flip-flop is always positive. Each input pulse from oscillator 402 causes the positive flip-flop to go negative with the result that the next flip-flop in the ring goes positive. This process continues repetitively as long as signals are supplied from the oscillator. The eight output signals A1–A8 from the ring are shown in FIG. 3 and define each of the eight subperiods of each zone. For reasons explained below, the ring 403 is set to its A4 position at the end of each character scan so that the first PK signal of the next character causes the ring to begin its sequence of timing pulses at A5.

A conventional four position binary counter 404 counts the number of times timing pulse A1 occurs. The beginning of each pulse A1 delineates the beginning of each of the time zones 2 through 8. Thus, the counter outputs C1, C2 and C3 from the $2^0$, $2^1$ and $2^2$ positions thereof represent a zone count. As shown in FIG. 3, during the first zone period the counter outputs C1–C3 are all zero. When the first A1 timing signal comes up, it causes AND circuit 410 to transmit a counter drive pulse through OR 412 to switch the counter to a count of one. This count is held at the counter output for the duration of the zone 2 period whereupon, when signal A1 comes up a second time OR 412 issues a second drive pulse, causing the counter to switch to a count of binary 2. This count, wherein output lines C1 and C3 are negative and C2 is positive, is held for the duration of the zone 3 period. When signal A1 comes up for the eighth time, signifying the termination of the zone 8 period, the $2^3$ output position of counter 404 transmits a positive-going signal which is applied to set a latch 409 and to reset input latch 401. Resetting of the latter circuit causes the ring 403 to switch to timing signal A4 and also terminates the outputs from oscillator 402 so that the ring remains a A4. Further, resetting of latch 401 resets the counter 404 back to its zero state.

The positive-going transition issued by the $2^3$ output from counter 404 also activates single-shot multivibrator circuits 413 and 414. The former responds with a positive signal I (FIG. 2) which is of a length determined by the minimum space which can occur between characters under worst case conditions of character spacing and document velocity. As is explained subsequently, the signal I is employed in the peak detection circuit 300 to inhibit the generation of PK output signals between character scans.

Single-shot 414 generates a positive signal RP (FIG. 2) which is employed to reset the signal storage capacitor in peak storage circuit 200. At the fall of the RP pulse, single-shot 422, initiated through an inverter 421, issues a pulse CR which is used to gate the final character output from the character recognition logic 800.

Each time signal A8 goes positive it energizes a single-shot 415, causing it to generate a signal S. When S falls, a single-shot 417 is activated through an inverter 416 and produces a signal IR. As shown in FIG. 3, S and IR occur sequentially at the termination of each zone period, S occurring just before zone termination and IR occurring just after. The former of these signals is employed, as explained subsequently, to gate the zone condition data present on the output lines of the integrators 500 and 600 into the peak classification register 700. The signal IR operates to reset each of the integrator circuits and to reset a signal storage capacitor employed in peak detector 300 to perform the reverse slope peak inhibit function, explained subsequently.

The purpose of latch circuit 409 and AND circuits 410 and 411 is to extend the period of zone 1 under certain conditions indicated by a signal GA from the peak detection circuit. This signal gates AND 410 to pass the zone 2 timing signal to the counter 404 and once zone 2 is initiated, the positive-going transition on the $2^0$ output of the counter is fed back to reset latch 409. Thereafter, for the duration of that character, the counter drive pulses are gated through AND 411.

The function of AND circuits 407 and 405, OR circuit 408 and inverter 406 is, as explained in detail subsequently, to permit retiming to take place, under certain conditions in response to any PK signal occurring after the first such signal for each chaarcter. The conditions necessary to effectuate a retiming operation are that the subsequent PK signals do not occur in the approximate center of a zone period, as defined by the subperiod signals A4 and A5.

Controlled gain amplifier

Figure 6:
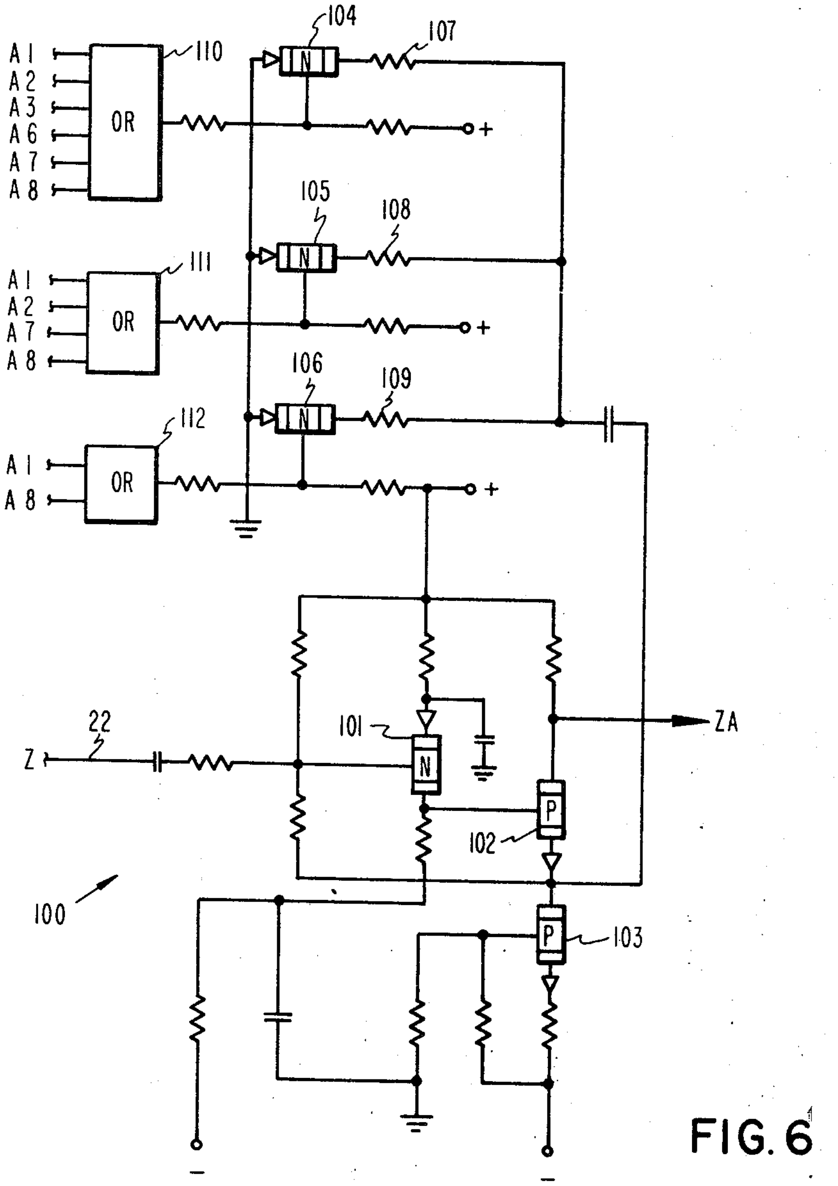
FIG. 6 is a schematic circuit diagram of the controlled gain amplifier of FIG. 1.

The controlled gain amplifier circuit 100 is shown in detail in FIG. 6. The circuit receives the inverted analog input signal Z from amplifier 20 on line 22 and selectively amplifies it to provide output analog signal ZA. Any peak fluctuation in the signal Z which occurs near the center of a zone period as defined by timing circuit 400 is accentuated in the signal ZA. Thus spurious peaks, which occur between valid peaks, do not receive the same amount of amplication in the circuit 100 with the result that their impact on integrating circuits 500 and 600 is minimized. A comparison between Z and ZA is shown in FIG. 2. Note that the effect of the amplifier 100 is to "sharpen" as well as to more clearly separate the peaks. The vertical scale used in illustrating ZA is compressed to conserve space.

The input signal Z is fed to the base of a first stage amplifying transistor 101 and the output ZA is taken from the collector of second stage amplifying transistor 102. Transistors 101 and 102 taken together form a feedback current amplifier. The gain of the amplifier is determined by the impedance applied to the emitter of transistor 102. To vary this impedance, switching transistors 104, 105 and 106 control the insertion of parallel resistors 107, 108 and 109 into the emitter circuit of transistor 102 in accordance with timing signals received from timing circuit 400.

Maximum voltage gain of the circuit is produced when all three of the resistors 107, 108 and 109 are placed into the emitter circuit by the switching of all three of the transistors 104, 105 and 106 into conduction. This occurs when the bases of these switching transistors are at a negative level as occurs when none of the three OR circuits 110, 111 and 112 is activated. This occurs during timing subperiods A4 and A5 as is determined by the fact that none of the circuits 110, 111 or 112 receives an input at these times. It will be recalled that subperiods A4 and A5 determine the center of each zone.

At the beginning and end of each zone period, the gain of the amplifier is at a minimum since during timing subperiods A1 and A8 all three of the OR circuits 110, 111 and 112 are activated and thus all three of the switching transistors are cut off. During A2 and A7 resistors 107 and 108 are out of the circuit and resistor 109 is in the circuit, causing the gain to be at a first intermediate level. During A3 and A6 only resistor 107 is out of the circuit so that the gain is at a second intermediate level higher than the first. The gain of the circuit 100 as a function of the timing signals is depicted in FIG. 3.

Transistor 103 is employed to stabilize the operating point of transistor 102. To achieve the gain levels depicted in FIG. 3, resistor 108 is made approximately twice the value of resistor 107 and resistor 109 is approximately 2.4 times the resistance of resistor 107.

Peak storage circuit

Figure 7:
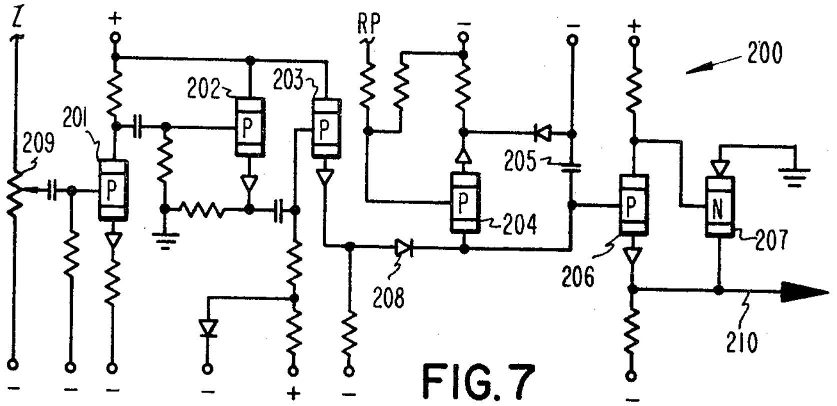
FIG. 7 is a schematic circuit diagram of the peak storage circuit of FIG. 1.

The peak storage circuit 200 is shown in detail in FIG. 7. This circuit stores on storage capacitor 205 a portion of the magnitude of the maximum negative peak occurring in the signal Z. The portion of the signal which is stored is determined by the setting of input potentiometer 209. Transistor 201 inverts the input signal and applies it to the base of rectifying transistor 202 such that only the positive portion of the signal is applied to the base of emitter follower 203. The latter transistor charges storage capacitor 205 through a coupling diode 208 so that the charge level on capacitor 205 at all times reflects the magnitude of the maximum positive swing exhibited at the emitter of 203. The stored signal level is coupled to output line 210 by a high input impedance-low output impedance network comprising a second-collector to first-emitter feedback transistor pair 206–207.

Discharge of capacitor 205 is effected by the application of timing pulse RP to the base of switching transistor 204. This signal biases transistor 204 into conduction and thus provides a low impedance discharge path to the negative voltage source at its emitter.

Peak detector

Figure 9:
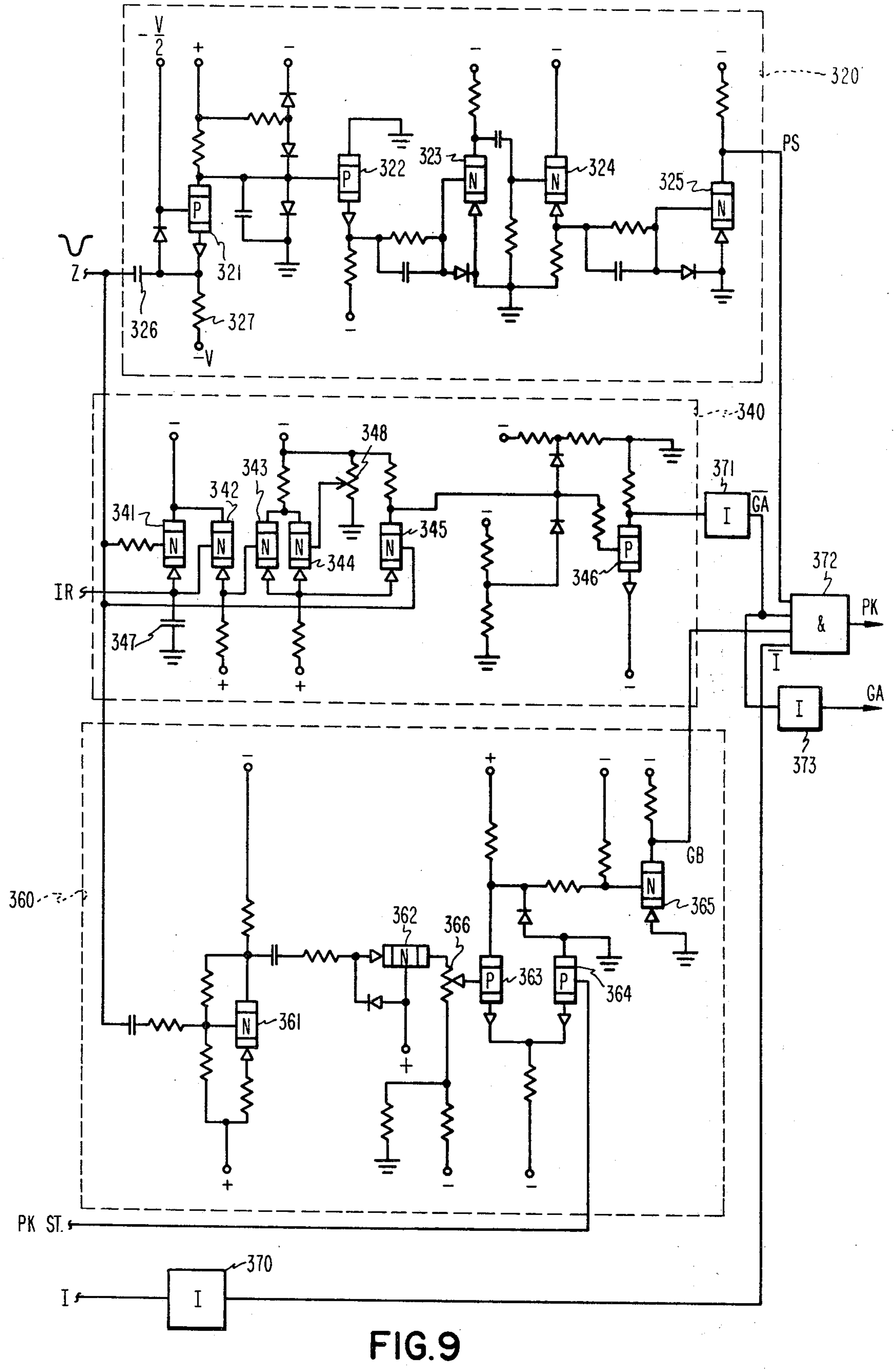
FIG. 9 is a schematic circuit diagram showing the circuit details of the peak detector generally illustrated in FIG. 8.

The peak detector circuit 300 is shown generally in the block diagram of FIG. 8 and in detail in the circuit schematic of FIG. 9. As shown in FIG. 8, the peak detector circuit comprises a basic peak sensing circuit 320, a first gating circuit 340 and a second gating circuit 360. The outputs of these three circuits are fed to the input of an AND circuit 372, the output from which supplies the signal PK. Timing signal I, inverted in an inverter 370, is also fed to the input of AND 372.

Peak sensor 320 provides a positive output signal of predetermined duration in response to each negative peak occurring in the analog waveform Z. The inverted signal $\overline{GA}$ from gate 340 inhibits the transmission through AND 372 of all outputs from circuit 320 which are produced in response to peak fluctuations which either fail to meet a predetermined fixed magnitude criteria or which occur during the trailing slope of a valid peak fluctuation. The re-inverted output signal GA from circuit 340 is fed to timing circuit 400 for the purpose of extending the duration of the zone 1 period under certain conditions, described subsequently. Gating circuit 360 receives the signal Z and compares its magnitude with the output from peak storage circuit 200. The output GB from the circuit 360 inhibits the tranmission through AND 372 of all outputs from peak sensor 320 which are produced in response to peak fluctuations which do not meet a minimum magnitude criteria as established by the level of signal stored in the peak storage circuit 200. This function of circuit 360 provides a basic noise discrimination level to be applied to the detection of peaks over the full character scan. The reason for allowing the revision of the discrimination level each time a more negative peak level is stored in the circuit 200 is to prevent the application over the entire character scan period of an abnormally low threshold level set by an unusually small initial peak. The signal $\overline{I}$ inhibits all outputs from circuit 320 which occur during the predetermined intercharacter time interval established by the duration of the signal I.

Referring now to FIG. 9 a detailed description is hereinafter given for each of the three circuits 320, 340 and 360. Peak sensor 320 includes a differentiating network 326–327 receiving the signal Z. Any positive shift in this signal, denoting the occurrence of a negative peak therein, causes a positive shift to appear at the emitter of transistor 321, momentarily cutting the transistor off from its normally conductive state. The positive pulse thus produced at the collector of the transistor is applied to the base of emitter follower 322 and is coupled thereby into a wave shaping network comprising a common emitter amplifier 323 feeding a clipping emitter follower 324 through a differentiating network. The shaped positive output pulse PS which appears at the collector of inverting amplifier 325 is fed to an input of AND circuit 372.

The peak sensor 320 is an extremely sensitive circuit producing an output pulse in response to every slight positive shift at the input.

Gating circuit 340 comprises a differential amplifier including transistors 343, 344 and 345. Input signal Z is applied to the base of transistor 345 while a threshold level determined by the setting of potentiometer 348 is applied to the base of transistor 344. Input signal Z is also applied to an emitter follower stage 341 which transfers the magnitude of this signal to storage capacitor 347 such that the signal level stored on the capacitor is always slightly more positive (due to the voltage drop across the base-emitter junction of transistor 341) than the most negative level experienced in the input signal. The stored level on capacitor 347 performs the reverse slope peak inhibit function, as explained subsequently. The signal stored on capacitor 347 is transferred to the base of differential amplifier transistor 343 through a second emitter follower 342. The signal level thus present at the base of transistor 343 is slightly more positive than that stored on the storage capacitor due to the voltage drop across the base-emitter junction of transistor 342.

Thus, transistor 345 cannot conduct so long as the level of the input signal remains more positive than the signals at the bases of transistors 343 and 344. Whenever the input signal goes more negative than either of these reference signals, transistor 345 is biased into conduction and causes a positive shift to be applied from its collector to the base of inverting amplifier 346 to cause a negative-going output shift to appear at the collector thereof. This shift is inverted by inverter 371 and applied to an input of AND 372 as a signal $\overline{GA}$. $\overline{GA}$ is inverted by circuit 373 to form signal GA. Whenever the input signal returns to a level more positive than the most negative of the signals at the bases of the transistors 343 and 344, output signal GA returns positive and a negative-going inhibiting signal is applied to AND 372. At the end of each zone period signal IR returns the signal level stored on capacitor 347 to a predetermined positive amplitude.

Gating circuit 360 includes an inverting current feedback amplifier 361 having a low output impedance for driving a common base stage 362. The collector of transistor 362 is coupled through a potentiometer 366 to the base of a first transistor 363 of differential pair 363–364. The signal level stored in peak storage circuit 200 is present at the base of transistor 364 while some portion, depending upon the setting of potentiometer 366, of input signal Z is applied to the base of transistor 363. Transistor 363 is biased into nonconduction so long as the level of the signal at its base is less than the level stored in the circuit 200. However, as soon as the base of 363 goes more positive than the base of 364, transistor 363 conducts and a negative-going shift appears at its collector. This shift is inverted by transistor 365 and appears as a positive-going shift at the third input of AND 372. This output signal remains positive so long as the level at the base of 363 remains above the signal at the base of 364. As soon as the former drops below the latter, a negative-going inhibiting shift appears at the input of AND 372.

Referring now to FIGS. 9 and 10, the operation of peak detector 300 is explained. In FIG. 10 a portion of analog signal Z occurring as it may actually appear at the beginning of a character scan is illustrated. Each of the negative-going peak fluctuations *a*, *b*, *c*, *d*, *e*, *f* and *g* occurring in this signal cause peak sensor 320 to produce a corresponding positive pulse $a'$, $b'$, $c'$, $d'$, $e'$, $f'$ and $g'$ in output signal PS. It is to be noted that only the negative peaks *e* and *g* are "valid" character peaks, the remaining peaks being present by reason either of circuit noise or of poor character formation, e.g., ink splatter.

As shown by the signal PK only three of these outputs from circuit 320 are transmitted to the timing circuit. The second and third represent the valid peaks *e* and *g* and the first is passed since it occurs on the leading slope of a valid peak and thus, due to the retiming circuits, does not adversely affect the system. The remaining pulses in PS are inhibited by the effects of one or more of the gating signals $\overline{GA}$, GB and $\overline{I}$ generated by the circuits 340, 360 and 370.

The fixed negative threshold level established by potentiometer 348 at the base of transistor 344 of gating circuit 340 is shown as a straight horizontal line in FIG. 10. At the beginning of the character scan signal $\overline{GA}$ is negative since neither the signal Z nor the level stored on capacitor 347 is more negative than this threshold. Peak detector pulse $a'$ is thus not transmitted through AND 372 due to the negative level of $\overline{GA}$. It is here noted that $\overline{I}$ is also negative and would prevent the transmission of pulse $a'$ even if $\overline{GA}$ were positive.

During the occurrence of peak *b* signal Z becomes more negative than the fixed threshold at the base of transistor 344 and thus output $\overline{GA}$ goes positive. Also, the negative signal level stored on capacitor 347 is increased by peak *b* so that the reverse slope threshold gate 340 becomes more negative than the fixed threshold. When peak *b* recedes and signal Z becomes more positive than this most negative threshold level, output $\overline{GA}$ drops back to its negative level and stays there until the signal Z once again becomes more negative than the reverse slope threshold level. During this time pulse $c'$ of the signal PS is inhibited.

As Z starts its negative swing toward the first valid peak *e*, the reverse slope threshold gain is again exceeded and signal $\overline{GA}$ goes positive. At this time the negative magnitude of capacitor 347 is increased, thus causing the reverse slope threshold to become more negative. The ripple peak *d* on the leading edge of the initial valid peak causes the signal Z to momentarily once again become more positive than the reverse slope threshold so that signal $\overline{GA}$ reverts to its negative inhibiting level for a short period of time. However, as the signal resumes its drop toward *e*, $\overline{GA}$ once again becomes positive and stays positive until the peak *e* is passed and signal Z becomes more positive than the reverse slope threshold level. Signal $\overline{GA}$ thereafter remains negative throughout the period of trailing (positive) slope in Z following the occurrence of peak *e*. Thus any pulses in PS, such as pulse $f'$, generated in response to ripple peaks such as peak *f* occurring on this trailing slope are inhibited by $\overline{GA}$. It is seen that any such spurious peak will be inhibited so long as its negative magnitude does not exceed that of the reverse slope threshold level (which is substantially equal to the magnitude of the valid peak).

Upon termination of the period of zone 1, signal IR discharges capacitor 347 and thus the reverse slope threshold rapidly goes positive and when it intersects the level of signal Z, $\overline{GA}$ goes positive. As soon as pulse IR terminates, capacitor 347 immediately starts charging in a negative direction due to the occurrence of peak *g*. As this peak crests, the reverse slope threshold levels off and signal $\overline{GA}$ goes negative during the trailing slope of peak *g*.

As shown in FIG. 10, the level of the input signal from the peak storage circuit is set to a level corresponding to the most negative peaks occurring in the signal Z. The threshold level set in gate 360 by potentiometer 366 is approximately one-half the magnitude of the peak storage level. Output signal GB from circuit 360 goes negative each time the signal Z goes more positive than this threshold level.

Thus, only pulses $d'$, $e'$ and $g'$ occurring in signal PS are transmitted to the signal PK. Pulse $a'$ is inhibited both by $\overline{I}$ and $\overline{GA}$ while pulse $d'$ is inhibited by $\overline{I}$ alone. Pulse $c'$ is inhibited by $\overline{GA}$ and GB while pulse $f'$ is inhibited by $\overline{GA}$ alone.

Up-down integrator

Figure 12:
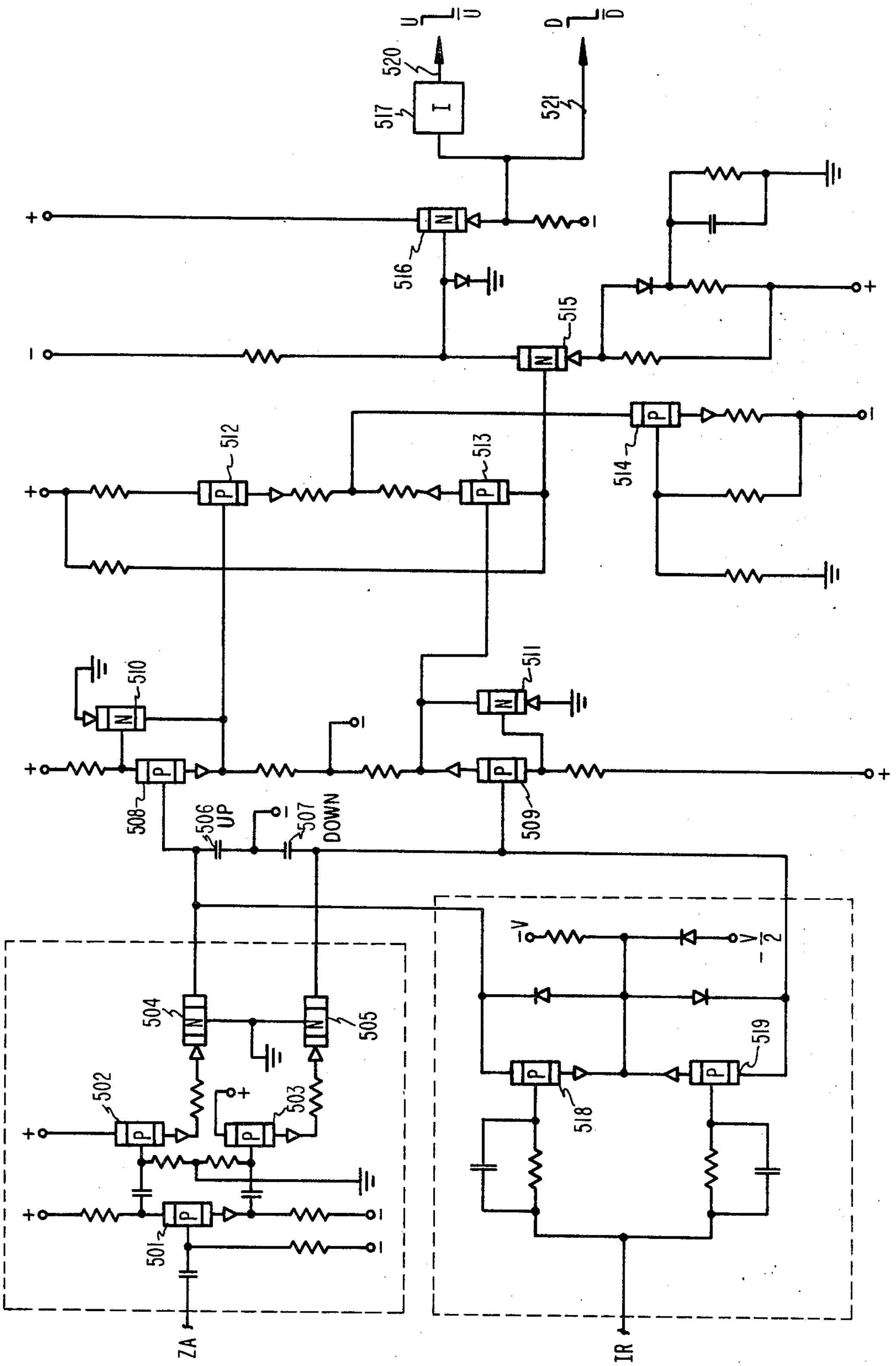
FIG. 12 is a schematic circuit diagram of the up-down integrating circuit of FIG. 1.

The circuit details of up-down integrator 500 are shown in FIG. 12. The selectively amplified analog signal ZA (which, it is recalled, is an inverted form of the scanning signal produced by read head 12) is applied to the base of transistor 501 which functions as a paraphrase amplifier. Thus, the positive portions, only, of the input signal are transmitted to the base of a zero biased emitter follower 502 and the negative portions, only, of the input signal are inverted and transmitted as positive swings to the base of zero biased emitter follower 503. Transistors 502 and 503 drive common base transistors 504 and 505, respectively. Integrating capacitors 506 and 507 are connected in the collector circuits of these transistors. The high output impedance of the common base configuration enables the achievement of the long time constant necessary for integration while permitting the use of relatively small integrating capacitors. The capacitors are thus capable of very rapid discharge at the end of each zone period in response to signal IR.

Since input signal ZA represents the scanning signal in inverted form, the signal level accumulated on capacitor 506 represents the magnitude of the positive portion of the scanning signal occurring during the zone period and the signal level accumulated on capacitor 507 represents the magnitude of the negative portion.

The stored signal levels are coupled through second collector-to-first emitter transistor pairs 508–510 and 509–511 to the bases of differentially connected transistors 512 and 513.

The differential pair 512–513, supplied by current source 514, compares the signal levels stored on the integrating capacitors and controls output transistor 515 in accordance with the results of the comparison. If the signal level on capacitor 506 exceeds that on capacitor 507, meaning that the character scanning signal was predominantly negative during the zone then being timed, transistor 515 is reverse biased by the potential at the collector of transistor 513 and the potential of UP output line 520, taken from emitter follower 516 through an inverter 517, is negative and the potential at DOWN output line 521 is positive.

Conversely, if the signal on capacitor 507 exceeds that on capacitor 506, the collector potential of transistor 513 biases transistor 515 into conduction, causing a negative shift at the emitter of emitter follower 516. UP output line 520 thus is positive and DOWN output line 521 is negative.

At the end of each zone period, signal IR is applied to the bases of transistors 518 and 519 causing them to conduct. In conduction these transistors provide low impedance discharge paths for capacitors 506 and 507.

At the termination of each zone period prior to occurrence of IR the relative magnitude of the input signal ZA during the zone with respect to its zero reference level is represented by the output signals on lines 520 and 521.

Plus-minus integrator

Figure 13:
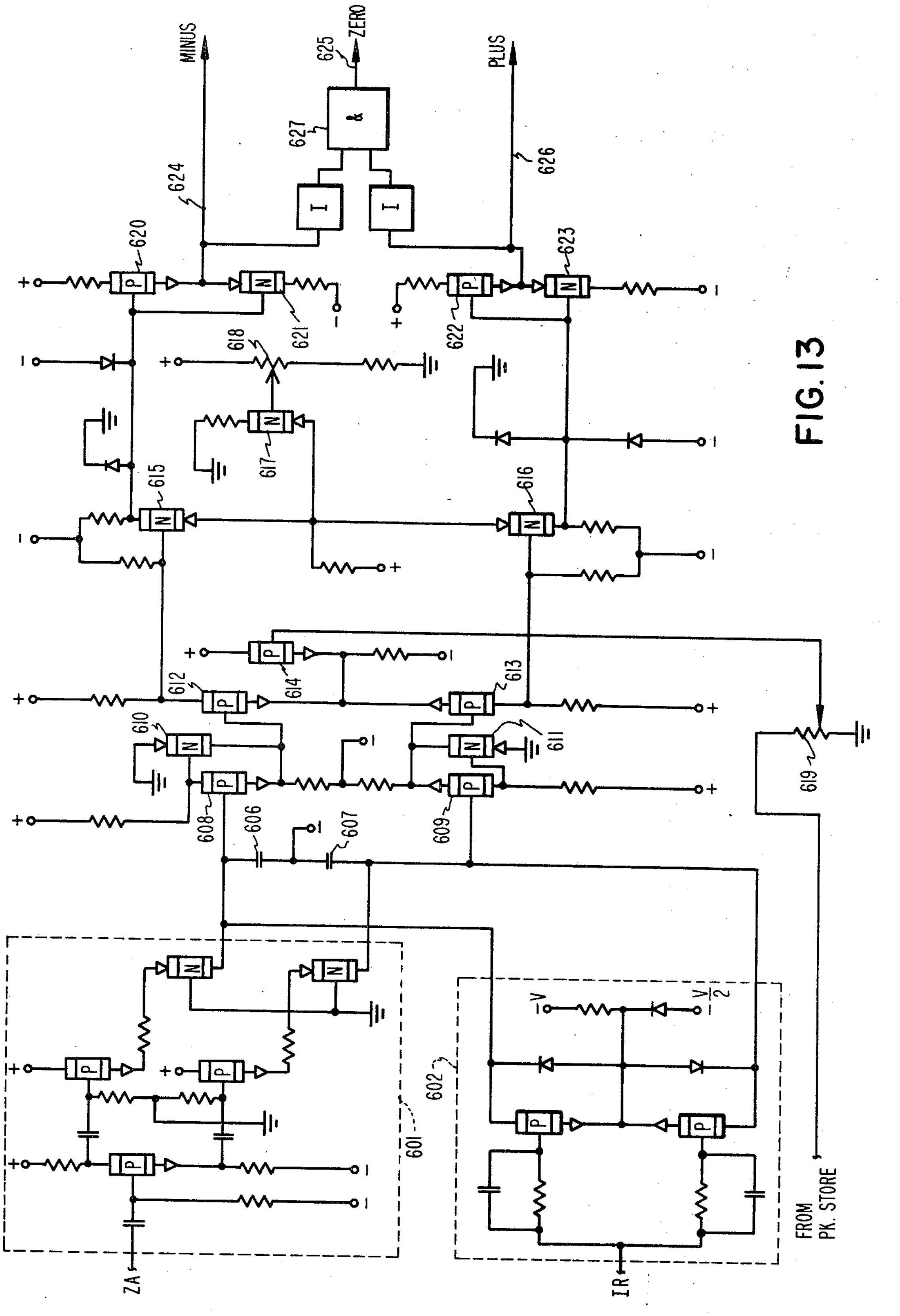
FIG. 13 is a schematic circuit diagram of the plus-minus integrating circuit of FIG. 1.

Circuit details for the plus-minus integrating circuit 600 are shown in FIG. 13. The input signal ZA is supplied to an integrating circuit 601 identical to that employed in the up-down integrator. Thus, the signal level accumulated on capacitor 606 represents the magnitude of the negative portion of the character signal occurring during the zone period and the signal level accumulated on capacitor 607 represents the magnitude of the positive portion of the character signal occurring during the zone. The signal levels on the two integrating capacitors are coupled through impedance matching networks 608, 610 and 609, 611 to the bases of transistors 612 and 613.

The emitters of transistors 612 and 613 are biased by emitter follower 614 to a level representing a predetermined portion, controlled by the setting of potentiometer 619, of the peak signal amplitude stored in peak storage circuit 200. The level at the emitter of transistor 614 represents both the plus and the minus threshold level. If the signal stored on minus capacitor 606 exceeds the threshold, transistor 612 is biased into conduction and a negative going shift is produced at the collector thereof. This shift biases transistor 615 into conduction and produces a positive, amplified shift at the collector thereof. This collector signal is applied to the bases of complementary emitter followers 620 and 621, turning the former on and the latter off. This presents a positive signal on MINUS output line 624 indicating that the magnitude of the peak fluctuation in signal ZA during the zone exceeded the negative threshold level.

When the signal at the base of transistor 613 from plus storage capacitor 607 exceeds the threshold level established at the emitter of emitter follower 614, transistor 613 is biased into conduction, turning transistor 616 on and causing a positive signal to appear on PLUS output line 626 taken from complementary emitter followers 622–623. This output signal signifies that a positive peak exceeding the plus threshold occurred in the signal ZA during the zone.

If neither of the output lines 624 or 626 is at a positive level, ZERO output line 625 supplied by AND 627 is at a positive level signifying the fact that no peak exceeding either the positive or negative threshold was detected in the signal ZA during the zone.

The combination of emitter follower 617 and potentiometer 618 is employed to establish a noise rejection threshold for transistors 615 and 616 to eliminate any spurious output signals which may be generated at the collectors of transistors 612 and 613.

An integrator reset circuit 602 identical to that employed in circuit 500 is employed to reset integrating capacitors 606 and 607 to a predetermined level in response to each IR signal at the end of the zone.

Peak classification register

Figure 14:
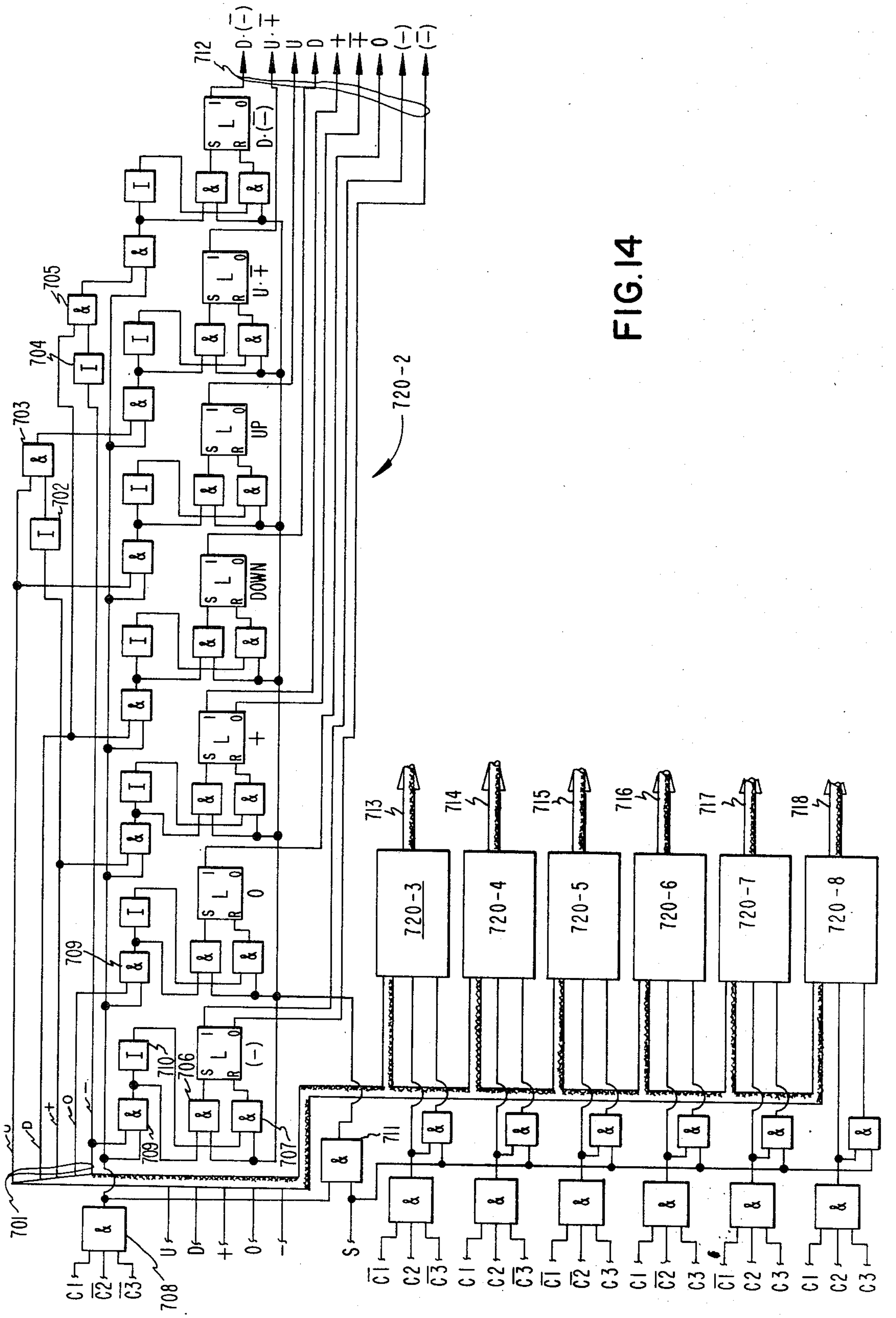
FIG. 14 is a schematic circuit diagram of the peak classification register of FIG. 1.

The peak classification register 700 is shown in detail in FIG. 14. Input lines 701 supply the five basic zone condition signals from the outputs of the integrating circuits 500 and 600 in parallel to a set of seven bistable latch circuits 720 provided for each of the zones 2 through 8. Since the latch array for each zone is identical, only array 720–2 for zone 2 is shown in detail. In the latch array, one latch is provided for storing the seven zone condition statements minus, zero, plus, down, up, up and not plus and down and not minus. The latter two statements are derived from the basic inputs on line 701 by an inverter 702 and AND 703 and an inverter 704 and AND 705. The set side of each latch is fed by a gating AND 706 and the reset side is fed by a gating AND 707. During the zone 2 period AND 708 is conditioned by the indicated outputs from the zone counter of timing circuit 400 to provide a positive output to one side of each of the gating AND's 709 associated with the seven latches and the gating AND 711 associated with the S signal input. Thus, if the zone condition statement to be stored in a given latch is positive, the output of AND 709 is positive and the output of the associated inverter 710 is negative. Therefore, the signal S occurring at the end of the zone period activates AND 706 to cause the 1 output of the latch to come up. On the other hand, if the signal level representing the zone condition statement to be stored is negative, the output of AND 709 is negative and the output of inverter 710 is positive. The signal S then causes AND 707 to reset the latch so that its 0 output is positive.

The zone condition statements for zone 2 are thus presented to the character recognition logic circuits 800 via latch output lines 712. Similarly, the zone condition statements for zones 3 through 8 are presented to the circuits 800 via lines 713 through 718, respectively.

At the termination of scanning of a character, the latch arrays 720–2 through 720–8 have all been loaded with the zone condition statements for the seven zones 2 through 8 and the output lines 712–718 are ready for sampling by the character recognition logic.

Character recognition logic

Figure 15:
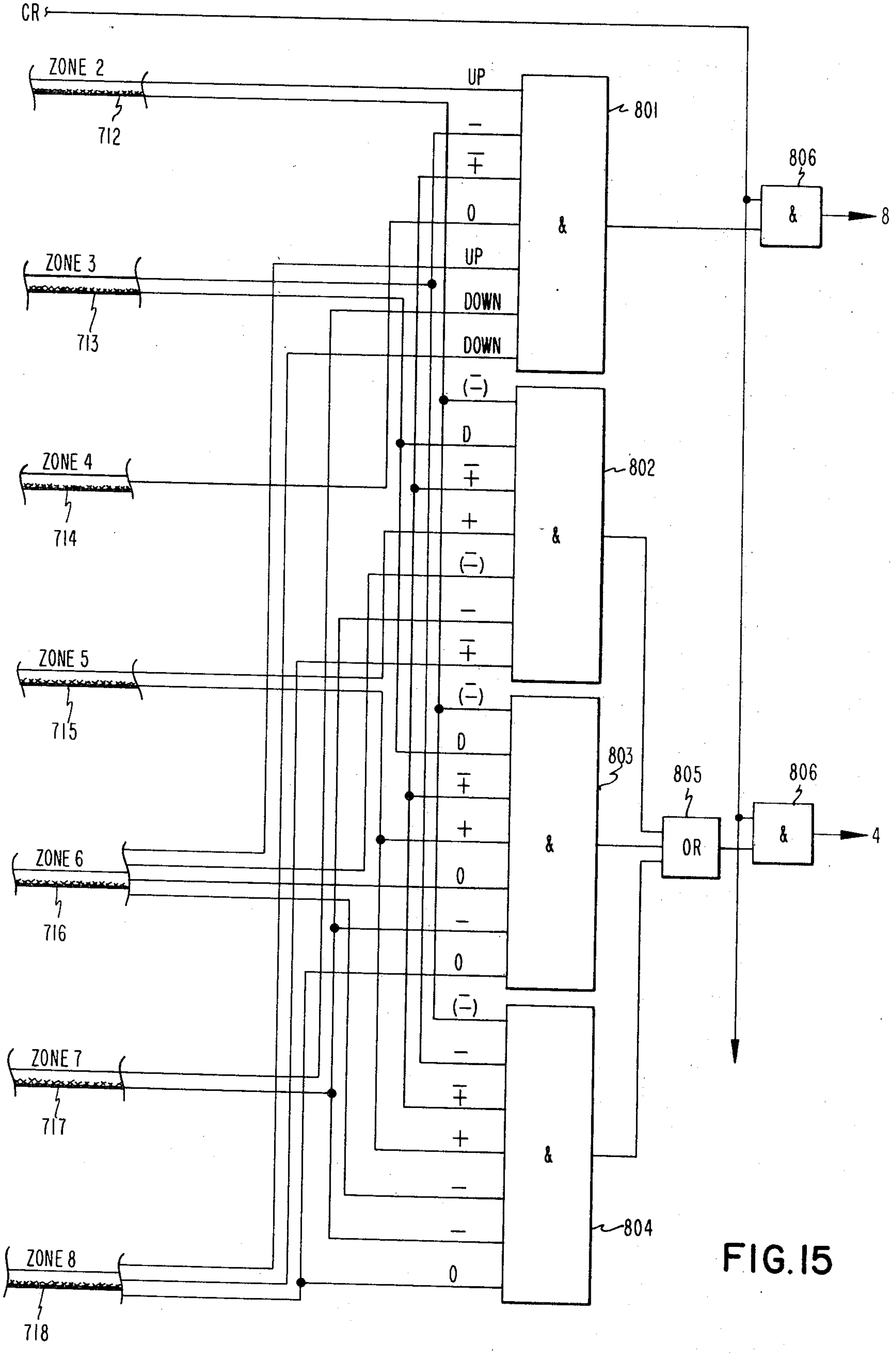
FIG. 15 is a schematic circuit diagram illustrative of a portion of the character recognition logic of FIG. 1.
Figure 16:
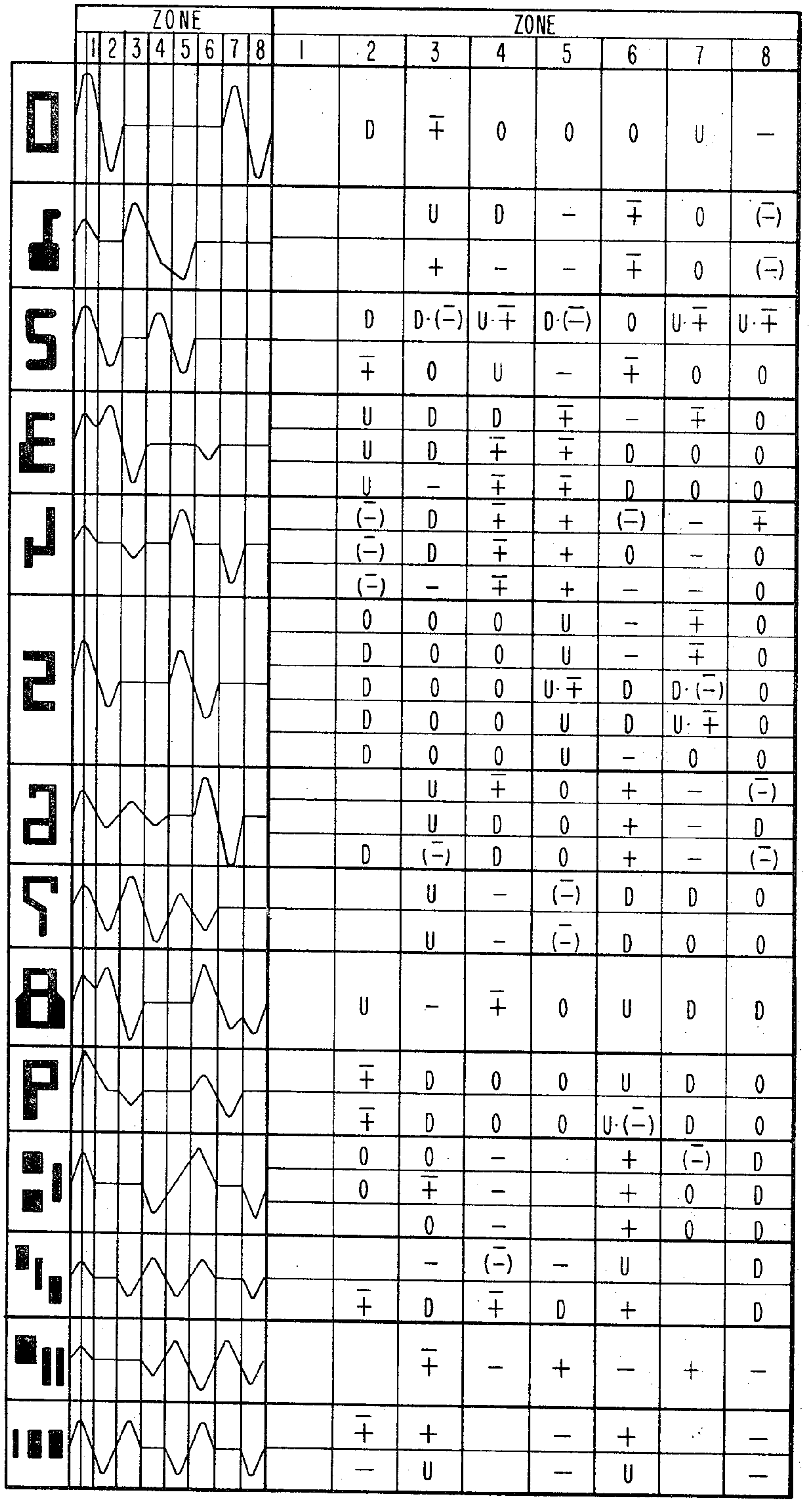
FIG. 16 is a chart illustrating the E 13 B characters 0 through 9 plus four special characters, the associated analog waveforms produced by each and the character recognition logic statements employed in the invention to identify each character.

A portion of the character recognition logic circuit 800 is shown in FIG. 15. The construction of the circuit is based upon the character recognition criteria illustrated in chart form in FIG. 16. For example, as shown in FIG. 16 it has been determined that that the character recognition statement (pattern of zone condition statements) required for most reliably detecting the character 8 are up, minus, not plus, zero, up, down and down for the zones 2 through 8 respectively. Therefore, as shown in FIG. 15 the character recognition logic 800 includes an AND circuit 801 receiving seven input signals from the seven output lines 712–718 from register 700. The line selected from each of the lines 712–718 for inputs to AND 801 are those required to satisfy the statement indicated in FIG. 16.

As another example, FIG. 16 indicates that reliable detection of the character 4 requires monitoring the outputs of register 700 for any of three separate patterns of zone condition statements. Accordingly, as shown in FIG. 15, three AND circuits 802, 803 and 804 receive inputs from lines 712–718 in accordance with the three zone condition statement patterns called for in the chart. An output from any one of these AND circuit activates OR circuit 805 to indicate the detection of the character 4.

Similarly, addition AND circuits are provided in character recognition logic 800 to inspect the outputs from the register 700 for the presence of the indicated zone condition statements for each of the numerals 0 and 9 and for the four special characters shown in the chart of FIG. 16.

A gating AND 806 controlled by timing pulse CR is provided at the output of each of the character recognition output circuits so that readout is effected at the proper time between character scans.

OPERATION

Nominal document velocity

Operation of the system under conditions of nominal document velocity and ideal character definition is hereinafter described with reference to FIGS. 1, 3 and 11. At the top of FIG. 3 is shown the shape of the analog input signal generated on line 14 by read head 12 in scanning the character 8 under conditions of nominal document velocity. Nominal document velocity means that the timing of the zone periods which is established by oscillator 402 and ring 403 accurately matches the timing of the character segments as they pass the read head. The initial character peak *a* causes a pulse PK to be transmitted from peak detector 300 to the timing circuit 400 where it sets latch 401 and starts oscillator 402. The oscillator pulses OSC cause the timing ring 403 to begin advancing, with the initial ring pulse being A5 since the ring had been previously reset to its A4 output state. After four subperiod pulses A5–A8 are generated by the ring, pulse A1 comes up and thus causes the zone counter 404 to switch from a count of zero to a count of binary 1. Thus, the period of zone 1 is terminated and zone 2 is initiated. As seen in FIG. 3, demarcation of the zones is depicted on the zero axis of the analog waveform. These demarcation points are defined by the switching of the counter in response to the rise of pulse A1. At the end of the zone 1 period, an S pulse occurs and is transmitted to the inputs of the gating AND's in peak classification register 700. However, since the counter at this time is in an all zero output state, the pulse S is not gated into the register 700 and has no effect thereon. This reflects the fact that the zone condition statements present at the outputs of the integrator circuits at the end of the period of zone 1 will be the same for all characters and thus are not useful for recognition purposes (note FIG. 16).

As the period of zone 2 begins, a pulse IR resets the integrating circuits 500 and 600 and resets the storage capacitor in the reverse slope peak inhibit gate of the peak detector 300. As the zone 2 period progresses, the analog input signal increases to a second positive peak *b* which appears as an accentuated negative peak in the signal ZA due to the increasing of the gain of amplifier 100. The peak *b* causes a second peak detector output PK to be fed to the timing circuit. This pulse has no effect on latch 401 since the latch is already in a set condition. Further, the PK pulse does not cause an output from retiming AND gate 405 since the peak occurred during subperiod A5 when inverter 406 is deconditioning AND 405.

At the end of the zone 2 period, after the second input peak has been integrated by the circuits 500 and 600, a signal is present on the UP output line of integrator 500 and a second signal is on either the PLUS or ZERO output lines of integrator 600. Since signals appear on the C1 and $\overline{C2}$ and $\overline{C3}$ output lines of zone counter 404, the second S signal causes these zone condition statement signals to be gated into and stored in the seven storage latches of the zone 2 latch array in register 700. It is noted at this point that whether or not the PLUS output is present at the end of the zone 2 period is not critical to character recognition since the zone 2 statement required for the character 8 is simply an UP (FIG. 16).

During the period of zone 3 the negative peak *c* is integrated and causes zone condition statements of DOWN and MINUS to be present at the integrator output lines at the termination of the zone. These are gated into the zone 3 latch array in register 700. It should be noted that no peak detector output signal is issued from the circuit 300 in response to the peak *c* because it is a negative peak and the peak sensing circuit of the peak detector does not respond to negative input peaks (which occur at the input to the peak detector as positive peaks).

During the zone 4 and 5 periods ZERO zone condition statements are generated by the integrator 600 and either UP or DOWN statements are generated by integrator 500. The zone condition statements for zone 6, which contains positive peak *d*, are UP and probably PLUS, although a ZERO could occur instead of PLUS. For zone 7 the statements generated are DOWN and probably ZERO since the magnitude of negative peak *e* will probably not exceed the negative threshold level in integrator 600 since that level has been determined by the larger peak *d*. During the zone 8 period peak *f* generates statements of DOWN and probably ZERO.

At the end of the zone 8 period the $2^3$ output of zone counter 404 goes positive, causing input latch 401 to reset, turning off oscillator 402 and resetting the timing ring to A4 and the zone counter to 0. Also at the end of the zone 8 period, the regular end of zone S and IR pulses are generated to perform their normal function. Further, single-shots 413 and 414 are energized to initiate the pulses I and RP (FIG. 2). At the fall of RP the character recognition gating pulse CR is generated by single-shot 422 to gate the character recognition output AND circuits in the circuit 800 to provide a character readout signal.

The next and subsequent characters scanned each cause the system to undergo the above-described sequence of operation.

Document velocity 10 percent fast

Operation of the system is hereinafter described for the case when document velocity is 10 percent above nominal. As described below with reference to FIGS. 1, 4 and 11, this calls the retiming circuit into play. It should be noted that in FIG. 4 the analog waveform generated by scanning the character 8 at a velocity 10 percent above nominal has substantially the same shape as that shown in FIG. 3 but it is compressed in time due to the increased scanning velocity.

Operation of the system is the same as described above for the nominal case up until the time the third PK signal is generated in response to peak *d*. Due to the timing mismatch this pulse occurs during ring time A1. Since at this time the lower input to AND 405 of the timing circuit is conditioned, the PK signal causes that AND circuit to generate an input to the timing ring 403 which causes the gating circuits therein to be conditioned to reset the ring to A5. Thus, when the next oscillator drive pulse occurs, the output of the ring goes to A5 rather than A2 (FIG. 4) and the timing cycle is thus caused to "skip," appreciably shortening the period of zone 6 and placing the timing circuit back into approximate synchronization with the analog input signal. As is also shown in FIG. 4, at the time retiming takes place the gain of amplifier 100 is caused to immediately increase to its maximum level at the beginning of the period of zone 6.

Thus, while retiming does not perfectly resynchronize the system to the analog input, it is sufficient to avoid character recognition errors which might otherwise occur. Further, the value of selectively increasing the gain of the amplifier 100 and of providing UP and DOWN zone condition statements in addition to PLUS, ZERO and MINUS is readily appreciated. It is noted (FIG. 16) that for proper recognition of the character 8, a ZERO statement must be generated during zone 5 and an UP statement during zone 6. As appears in FIG. 4, the positive peak *d* occurs at a point substantially between zones 5 and 6. Thus, it is quite likely that without the effects of controlled gain amplifier 100 the portion of the peak *d* occurring in zone 5 could cause a PLUS statement rather than a ZERO statement to be generated. However, since the gain of amplifier 100 is, during the zone 5 period, lowest when the magnitude of the peak *d* is highest this portion of the peak does not appear to be accentuated in the signal ZA and will still enable the integrator 600 to generate the required ZERO statement. Also, the failure to include the full magnitude of the peak in zone 6 will probably prevent the generation of a PLUS zone condition statement for that zone. However, as noted from FIG. 16, proper recognition of the character requires identification of zone 6 simply as UP rather than PLUS.

Document velocity 10 percent slow

Looking now at FIG. 5, it is seen that the analog waveform there depicted is of the same form as that shown in FIG. 3 except that it is expanded in time by approximately 10 percent. Operation of the system through the first five zone periods is the same as that previously discussed for both the nominal velocity and fast velocity cases. In the slow velocity case, however, the output from the peak detector corresponding to the analog peak *d* occurs during subperiod A8 of the sixth zone. Thus, instead of next advancing to subperiod A1 of zone 7, timing ring 403 is caused to revert to subperiod A5 and, since the A1 pulse does not come up at this time, zone counter 404 is not advanced and remains at a count indicative of zone 6. Note, however, that the S and IR signals were not prevented from occurring when they would have occurred at the normal end of zone 6. The S signal gates premature zone condition statements into the register 700 and the IR signal causes the integrators to be reset. However, since the retiming operation advances the gain of amplifier 100 to its maximum level substantially in synchronization with the crest of analog peak *d*, sufficiently accurate zone condition statements will be generated during the extended portion of the zone 6 period such that when the second zone 6S signal occurs, the premature statements in the register 700 are replaced with accurate statements.

At this point the function of the first zone extension circuits 409, 410, 411 and 412 of the timing circuit may be readily understood. As has been previously stated, spurious peak detector output signals occurring in response to ripples on the leading slope of a valid peak do not adversely affect system operation since when the valid peak occurs, retiming, as above described, will take place. However, it sometimes happens that ripples occurring on the leading slope of the initial peak occur more than four timing subperiods prior in time to the initial peak. This is particularly likely to occur when the initial peak is unusually large in amplitude. Retiming cannot correct for this situation since once signal A1 comes up, the zone counter is advanced to a count of 1, indicating zone 2, and the initial peak then becomes erroneously classified as a zone 2 peak and all remaining peaks are similarly offset by one zone.

To correct for this, the signal GA, generated at the output of gate 340 of the peak detector circuits (FIG. 9) is fed to one input of an AND circuit 410 of timing circuit 400. As previously described, this AND circuit gates pulse A1 from ring 403 to the drive input of zone counter 404 to cause the latter to advance from a count of 0 to a count of 1 at the termination of zone 1. As shown in FIG. 10, the signal GA is negative substantially for the full extent of the leading edge of the initial peak *e*. Thus, any peak detector output produced in response to a ripple on this leading slope cannot cause the counter to advance in the erroneous manner described above.

Latch circuit 409, AND 411 and OR 412 are included so that the zone extending function of the signal GA is utilized only prior to the first zone period. Thus, when the zone counter advances to a count of 1, latch 409 is reset, deconditioning AND 410 and conditioning AND 411. Thereafter, inputs to the zone counter are gated through AND 411 and OR 412. The end-of-character signal generated by the $2^3$ counter output position is employed to set latch 409 to prepare AND 410 for the next character.

It may readily be appreciated that the greatly expanded variety of zone condition statements made available by the system for analysis of each character segment greatly improves the reliability of character recognition. It also permits promulgation of desired "special conditions" whenever specific problems arise in individual systems. For example, it may be desirable to provide an additional latch in the register 700 to store a signal indicating that peak detector 300 generated an output signal during one of the final four zone periods of the character scan. Since an output from the peak detector 300 denotes occurrence of a peak having a magnitude exceeding the threshold of peak detector gate 360, which threshold is determined by the magnitude of previous peaks of that character, this information may be useful in differentiating between such characters as 4 and 5 and 6 and 9.

Another special condition that may be useful in improving character recognition reliability is indicated by the occurrence during either the zone 4 or the zone 5 period of an output signal from peak sensor 320 at a time when $\overline{GA}$ is positive and GB is negative. Such an indication denotes occurrence of a peak higher than the fixed magnitude threshold of gate 340 but lower than the variable magnitude threshold of gate 360 and can be useful in improving the ability of the system to differentiate between a 2 and a 3.

It is readily apparent that other special logic statements in the nature of those just described may be derived in the system to meet other special recognition requirements.

It is also apparent that the principles of the invention may be readily adapted to any system of character recognition wherein the character scanner supplies a derivative waveform. Thus the scanner may, for example, be optical rather than magnetic.

While the invention has been particularly shown and described with reference to a preferred embodiment thereof, it will be understood by those skilled in the art that the foregoing and other changes in form and details may be made therein without departing from the spirit and scope of the invention.

I claim:

1. In a character recognition system wherein an analog waveform generated by scanning a character is analyzed to develop a digital output signal representative of said character, the combination comprising:

a peak sensing circuit receiving said analog waveform and generating an output signal in response to each peak of a predetermined polarity occurring in said waveform;

a gating circuit adapted to transmit said output signals from said peak sensing circuit;

timing means responsive to said signals transmitted by said gating circuit for generating timing signals defining a plurality of predetermined character scan segments;

circuit means, including peak storage means for storing substantially the maximum amplitude of said predetermined polarity occurring in said analog waveform, for generating an inhibit signal to disable said gating circuit whenever the amplitude of said analog waveform, in terms of said predetermined polarity, is less than the amplitude stored in said peak storage means; and means responsive to said timing circuit for resetting said peak storage means to a predetermined minimum amplitude upon termination of each said character segment.

2. The character recognition system set forth in claim 1, further comprising:

counting means for counting said segment-defining timing signals;

means for inverting said inhibit signal; and means responsive to said inverted inhibit signal for preventing the advance of said counting means.

3. In a character recognition system wherein an analog waveform generated by scanning a character is analyzed to develop a digital output signal representative of said character, the combination comprising:

a peak sensing circuit receiving said analog waveform and generating an output signal in response to each peak of a predetermined polarity occurring in said waveform;

a gating circuit adapted to transmit said output signals from said peak sensing circuit;

timing means responsive to said signals transmitted by said gating circuit for generating a timing signal defining the terminus of said character;

circuit means, including peak storage means for storing the maximum amplitude of said predetermined polarity occurring in said analog waveform, for generating an inhibit signal to disable said gating circuit whenever the amplitude of said analog waveform, in terms of said predetermined polarity, is less than a predetermined portion of the amplitude stored in said peak storage means; and means responsive to said timing signal for resetting said peak storage means to a predetermined minimum amplitude.

4. In a character recognition system wherein an analog waveform generated by scanning a character is analyzed to develop a digital output signal representative of said character, the combination comprising:

timing means responsive to said analog waveform and generating timing signals for separating said waveform into a plurality of portions, each said portion being definitive of a predetermined character scan segment;

first classifying means for producing a first digital signal when one of said waveform portions is predominantly more positive than a predetermined zero-reference level, and for producing a second digital signal when said one portion is predominantly more negative than said level;

second classifying means for producing a third digital signal when one of said waveform portions is predominantly more positive than said zero-reference level by an amount exceeding a predetermined threshold magnitude, for producing a fourth digital signal when said one portion is predominantly more negative than said level by an amount exceeding said threshold magnitude, and for producing a fifth digital signal when said one portion is predominantly either more positive or more negative than said level by an amount not exceeding said threshold magnitude; and recognition means for defining a set of characters in terms of predetermined combinations of the presence or absence of said five digital signals; and means responsive to said timing means for introducing said five digital signals into said recognition means over a plurality of said scan segments so as to cause said recognition means to produce said output signal representative of said scanned character.

5. The character recognition system set forth in claim 4, wherein said second classifying means comprises:

means for integrating said waveform portion;

means responsive to said integrating means for comparing the integrated waveform portion with said threshold magnitude;

means responsive to said integrating means for comparing the integrated waveform portion with said zero-reference level;

means responsive to both said comparing means for producing said third, fourth and fifth digital signals; and means responsive to said timing means for resetting integrated means at the end of each said scan segment.

6. The character recognition system set forth in claim 5, wherein said first classifying means comprises:

means for integrating said waveform portion;

means responsive to said integrating means for comparing the integrated waveform portion with said zero reference level, and for producing said first and second digital signals; and means responsive to said timing means for resetting said integrating means at the end of each said scan segment.

7. The character recognition system set forth in claim 4, further comprising:

an amplifier for amplifying said analog waveform prior to said first and second classifying means; and means responsive to said timing means for varying the gain of said amplifier such that said gain has a minimum value both at the beginning and at the end of each said scan segment, and such that said gain has a maximum value substantially at the center of each said scan segment.

8. The character recognition system set forth in claim 4, wherein said timing means is operable to produce a signal defining the terminus of said scanned character, and wherein said system further comprises:

means for storing the maximum amplitude of a predetermined polarity of said waveform;

means for modifying said threshold magnitude in response to said maximum amplitude; and means responsive to said terminus-defining signal for resetting the signal amplitude stored in said storing means to a predetermined minimum value.

9. The character recognition system set forth in claim 4, further comprising:

peak-sensing means receiving said analog waveform for generating a signal in response to each peak of predetermined polarity ocurring in said waveform;

gating means for transmitting said last-named signal to said timing means as as to influence the generation of said timing signals; and means for generating an inhibit signal for disabling said gating means when the amplitude of said analog waveform, in terms of said predetermined polarity, is less than a predetermined portion of the amplitude stored in said storing means.

References Cited

UNITED STATES PATENTS

| | | | |
|---|---|---|---|
| 2,992,408 | 7/1961 | Eldredge et al. | |
| 3,146,422 | 8/1964 | Greanias et al. ---- | 340—146.3 |
| 3,302,174 | 1/1967 | Djinis et al. ------ | 340—146.3 |
| 3,316,536 | 4/1967 | Andrews et al. ---- | 340—146.3 |

MAYNARD R. WILBUR, Primary Examiner

L. H. BOUDREAU, Assistant Examiner